(12) United States Patent
Nam et al.

(10) Patent No.: US 12,313,329 B2
(45) Date of Patent: *May 27, 2025

(54) VACUUM ADIABATIC BODY AND REFRIGERATOR

(71) Applicant: LG ELECTRONICS INC., Seoul (KR)

(72) Inventors: Hyeunsik Nam, Seoul (KR); Daewoong Kim, Seoul (KR); Bongjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,517

(22) Filed: Aug. 14, 2023

(65) Prior Publication Data

US 2023/0384020 A1    Nov. 30, 2023

Related U.S. Application Data

(63) Continuation of application No. 16/767,899, filed as application No. PCT/KR2018/015710 on Dec. 11, 2018, now Pat. No. 11,768,026.

(30) Foreign Application Priority Data

Dec. 13, 2017    (KR) .................. 10-2017-0171661

(51) Int. Cl.
*F25D 21/14*    (2006.01)
*F25D 23/06*    (2006.01)
*F16L 59/065*    (2006.01)

(52) U.S. Cl.
CPC ........... *F25D 21/14* (2013.01); *F25D 23/065* (2013.01); *F16L 59/065* (2013.01);
(Continued)

(58) Field of Classification Search
CPC .......... F16L 59/065; F16L 59/02; F25D 23/06
See application file for complete search history.

(56) References Cited

U.S. PATENT DOCUMENTS 2,000,882 A    5/1935  Comstock
2,464,526 A    3/1949  Palmer
(Continued)

FOREIGN PATENT DOCUMENTS

CN    1062591    7/1992
CN    1420331    5/2003
(Continued)

OTHER PUBLICATIONS

Translation (Year: 2017).*
(Continued)

*Primary Examiner* — Filip Zec
(74) *Attorney, Agent, or Firm* — KED & ASSOCIATES, LLP

(57) ABSTRACT

A vacuum adiabatic body according to the present invention includes a supporting block which is fastened to an outer surface of any one plate placed outside the control space in a plate member which provides a wall of the vacuum adiabatic body. Accordingly, since the vacuum adiabatic bodies in a state of being not in contact with each other can be fastened to each other, various products corresponding to the needs of the consumer can be provided.

20 Claims, 23 Drawing Sheets

(52) U.S. Cl.
CPC .... *F25D 2201/14* (2013.01); *F25D 2321/146* (2013.01); *F25D 2323/024* (2013.01)

(56) References Cited

U.S. PATENT DOCUMENTS

| | | | |
|---|---|---|---|
| 2,518,673 A | 8/1950 | Ellsworth | |
| 2,989,156 A | 6/1961 | Brooks et al. | |
| 3,936,553 A | 2/1976 | Rowe | |
| 4,632,470 A | 12/1986 | Jenkins et al. | |
| 4,822,117 A | 4/1989 | Boston, Jr. | |
| 5,011,729 A | 4/1991 | McAllister | |
| 5,429,398 A | 7/1995 | Lupke | |
| 5,485,397 A | 1/1996 | Yamazato | |
| 5,897,181 A | 4/1999 | Avendano et al. | |
| 6,038,830 A | 3/2000 | Hirath et al. | |
| 6,178,763 B1 | 1/2001 | Brancheau et al. | |
| 6,209,342 B1 | 4/2001 | Banicevic et al. | |
| 6,350,002 B1 | 2/2002 | Takaoka et al. | |
| 6,485,122 B2 | 11/2002 | Wolf | |
| 6,725,624 B2 | 4/2004 | Hirath | |
| 6,779,357 B1 | 8/2004 | Fann | |
| 6,926,863 B1 | 8/2005 | Goeldner | |
| 7,407,240 B2 | 8/2008 | Collins et al. | |
| 7,762,634 B2 | 7/2010 | Tenra | |
| 8,211,523 B2 | 7/2012 | Fujimori | |
| 8,864,253 B2 | 10/2014 | Görz et al. | |
| 8,920,899 B2 | 12/2014 | Fujimori | |
| 9,074,717 B2 | 7/2015 | Nomura | |
| 9,155,419 B2 | 10/2015 | Bird | |
| 9,170,046 B2 | 10/2015 | Jung | |
| 9,441,779 B1 | 9/2016 | Alshourbagy et al. | |
| 9,546,481 B2 | 1/2017 | Kimura | |
| 9,557,092 B1* | 1/2017 | Heussner | F25D 11/04 |
| 9,689,604 B2 | 6/2017 | Wu | |
| 9,696,083 B2 | 7/2017 | Kim et al. | |
| 9,702,615 B1 | 7/2017 | Chartrand et al. | |
| 9,849,405 B2 | 12/2017 | Smith | |
| 10,088,227 B2* | 10/2018 | Bowdish | F25D 3/10 |
| 10,129,994 B1 | 11/2018 | Sulem | |
| 10,180,280 B2 | 1/2019 | Lee | |
| 10,274,247 B2 | 4/2019 | Jeong et al. | |
| 10,712,080 B2 | 7/2020 | Westlake et al. | |
| 10,753,669 B2 | 8/2020 | Dherde et al. | |
| 10,760,849 B2 | 9/2020 | Jung et al. | |
| 10,816,129 B2* | 10/2020 | Jung | F25D 23/028 |
| 10,837,696 B2 | 11/2020 | Jung et al. | |
| 10,907,883 B2 | 2/2021 | Dherde et al. | |
| 10,907,887 B2 | 2/2021 | Jung et al. | |
| 10,913,232 B2 | 2/2021 | Dye et al. | |
| 10,941,974 B2 | 3/2021 | Jung et al. | |
| 11,047,616 B2 | 6/2021 | Jeong et al. | |
| 11,079,171 B2 | 8/2021 | Marinello et al. | |
| 11,248,833 B2 | 2/2022 | Kim et al. | |
| 11,835,290 B2 | 12/2023 | Kim et al. | |
| 2002/0041134 A1 | 4/2002 | Wolf et al. | |
| 2002/0100250 A1 | 8/2002 | Hirath et al. | |
| 2003/0041612 A1 | 3/2003 | Piloni | |
| 2004/0012315 A1 | 1/2004 | Grace et al. | |
| 2004/0035142 A1 | 2/2004 | Yoon et al. | |
| 2004/0226956 A1 | 11/2004 | Brooks | |
| 2005/0175809 A1 | 8/2005 | Hirai | |
| 2006/0130513 A1 | 6/2006 | Chang et al. | |
| 2007/0133192 A1 | 6/2007 | Alessandro | |
| 2007/0228907 A1 | 10/2007 | Luisi et al. | |
| 2008/0095970 A1 | 4/2008 | Takashima | |
| 2008/0302441 A1 | 12/2008 | Kelly et al. | |
| 2009/0031659 A1 | 2/2009 | Kalfon | |
| 2009/0113899 A1* | 5/2009 | Dain | F25D 23/062 62/48.1 |
| 2009/0133225 A1 | 5/2009 | Brugger | |
| 2009/0284116 A1 | 11/2009 | Görz et al. | |
| 2010/0104923 A1* | 4/2010 | Takeguchi | H01M 8/026 429/456 |
| 2010/0252698 A1 | 10/2010 | Dye et al. | |
| 2010/0279055 A1 | 11/2010 | Song et al. | |
| 2010/0287974 A1 | 11/2010 | Cur et al. | |
| 2011/0011106 A1 | 1/2011 | Ahn et al. | |
| 2011/0209493 A1 | 9/2011 | Schenk | |
| 2012/0044131 A1 | 2/2012 | Nussbächer et al. | |
| 2012/0104923 A1* | 5/2012 | Jung | F25D 23/065 312/406 |
| 2012/0125039 A1* | 5/2012 | Hwang | F16L 59/065 428/69 |
| 2012/0128420 A1 | 5/2012 | Schroeder et al. | |
| 2012/0128920 A1* | 5/2012 | Yoon | F16L 59/07 428/188 |
| 2012/0235551 A1 | 9/2012 | Park et al. | |
| 2012/0248125 A1 | 10/2012 | Fricke | |
| 2013/0105494 A1 | 5/2013 | Jung | |
| 2013/0105495 A1 | 5/2013 | Jung | |
| 2013/0105496 A1 | 5/2013 | Jung | |
| 2013/0111942 A1 | 5/2013 | Jung | |
| 2013/0257256 A1 | 10/2013 | Allard et al. | |
| 2014/0369063 A1 | 12/2014 | Kleo et al. | |
| 2015/0030800 A1 | 1/2015 | Jung | |
| 2015/0192355 A1 | 7/2015 | Joo et al. | |
| 2015/0245720 A1 | 9/2015 | Isfort et al. | |
| 2015/0276302 A1 | 10/2015 | Roh | |
| 2016/0047592 A1 | 2/2016 | Rolek et al. | |
| 2016/0109172 A1 | 4/2016 | Kim et al. | |
| 2016/0161174 A1 | 6/2016 | Yi et al. | |
| 2016/0220039 A1 | 8/2016 | Chang et al. | |
| 2016/0258671 A1 | 9/2016 | Allard et al. | |
| 2017/0167781 A1 | 6/2017 | Mukherjee et al. | |
| 2017/0176090 A1 | 6/2017 | Allard et al. | |
| 2017/0176092 A1 | 6/2017 | Naik | |
| 2017/0184341 A1 | 6/2017 | Grimm et al. | |
| 2017/0292776 A1 | 10/2017 | Kim | |
| 2017/0336129 A1 | 11/2017 | Cunningham | |
| 2017/0370632 A1 | 12/2017 | Jeong et al. | |
| 2018/0156523 A1 | 6/2018 | Park et al. | |
| 2018/0180350 A1 | 6/2018 | Yoon | |
| 2018/0216873 A1 | 8/2018 | Jung et al. | |
| 2018/0238610 A1 | 8/2018 | Jung et al. | |
| 2018/0292127 A1 | 10/2018 | Park et al. | |
| 2019/0120544 A1 | 4/2019 | Deka | |
| 2019/0120547 A1 | 4/2019 | Staud et al. | |
| 2019/0145697 A1 | 5/2019 | Naik et al. | |
| 2019/0154328 A1 | 5/2019 | Dherde et al. | |
| 2019/0310011 A1 | 10/2019 | Marinello | |
| 2020/0182393 A1 | 6/2020 | Jung et al. | |
| 2020/0370819 A1 | 11/2020 | Kim et al. | |
| 2021/0108852 A1 | 4/2021 | Guizoni, Jr. et al. | |
| 2021/0108882 A1 | 4/2021 | Duford | |
| 2021/0140704 A1 | 5/2021 | Kim et al. | |
| 2021/0190255 A1 | 6/2021 | Allard et al. | |
| 2022/0136762 A1 | 5/2022 | Raskar | |
| 2022/0205708 A1 | 6/2022 | Harikrishnasamy et al. | |

FOREIGN PATENT DOCUMENTS

| | | |
|---|---|---|
| CN | 1603728 | 4/2005 |
| CN | 2800193 | 7/2006 |
| CN | 100449231 C | 1/2009 |
| CN | 101995140 | 3/2011 |
| CN | 102679663 | 9/2012 |
| CN | 102829593 | 12/2012 |
| CN | 103189696 | 7/2013 |
| CN | 103471314 | 12/2013 |
| CN | 103733007 | 4/2014 |
| CN | 105393073 | 3/2016 |
| CN | 105627657 | 6/2016 |
| CN | 106016931 | 10/2016 |
| CN | 106052248 | 10/2016 |
| CN | 106642951 | 5/2017 |
| CN | 107110593 | 8/2017 |
| CN | 107850377 | 3/2018 |
| DE | 19745825 | 4/1999 |
| EP | 1338854 | 8/2003 |
| EP | 1 808 657 B1 | 7/2010 |
| EP | 2 589 904 | 5/2013 |
| EP | 2985551 | 2/2016 |
| EP | 3105519 | 12/2016 |
| EP | 3 193 110 | 7/2017 |

(56) References Cited

FOREIGN PATENT DOCUMENTS

| | | |
|---|---|---|
| GB | 890372 | 2/1962 |
| JP | S58-64239 | 4/1983 |
| JP | H04-327779 | 11/1992 |
| JP | 08-303937 | 11/1996 |
| JP | 08-338679 | 12/1996 |
| JP | 2004-293913 | 10/2004 |
| JP | 2008-089244 | 4/2008 |
| JP | 2013-002655 | 1/2013 |
| JP | 2014-126219 | 7/2014 |
| JP | 2015-129634 A | 7/2015 |
| KR | 20-1998-0018139 | 7/1998 |
| KR | 10-0343719 | 7/2002 |
| KR | 10-2006-0071848 | 6/2006 |
| KR | 10-0725790 B1 | 6/2007 |
| KR | 10-2011-0006997 | 1/2011 |
| KR | 10-2011-0006998 | 1/2011 |
| KR | 10-2011-0056943 | 5/2011 |
| KR | 10-2013-0048529 | 5/2013 |
| KR | 10-2015-0012712 | 2/2015 |
| KR | 10-2016-0044842 | 4/2016 |
| KR | 10-2016-0046713 | 4/2016 |
| KR | 10-1631904 B1 | 6/2016 |
| KR | 10-2017-0016187 A | 2/2017 |
| RU | 2008 111 149 A | 8/2006 |
| RU | 2315925 C2 | 1/2008 |
| RU | 2468316 C2 | 11/2012 |
| SU | 1742602 | 6/1992 |
| SU | 1781519 | 12/1992 |
| TO | 103090615 | 5/2013 |
| WO | WO 2000/0004935 | 2/2000 |
| WO | WO 02/12810 | 2/2002 |
| WO | WO 2006/011112 | 2/2006 |
| WO | WO 2011/007959 A3 | 1/2011 |
| WO | WO 2012/050308 | 4/2012 |
| WO | WO 2013/164176 | 11/2013 |
| WO | WO 2014-103753 | 7/2014 |
| WO | WO 2014/196609 | 12/2014 |
| WO | WO 2016/105019 | 6/2016 |
| WO | WO 2017/023094 | 2/2017 |
| WO | WO 2017/023095 A1 | 2/2017 |
| WO | WO 2017/023100 | 2/2017 |
| WO | WO-2017023100 A1 * | 2/2017 ............ F16L 59/065 |
| WO | WO 2017/080767 | 5/2017 |
| WO | WO 2017/119614 | 7/2017 |
| WO | WO 2017/180126 | 10/2017 |
| WO | WO-2019117599 A1 * | 6/2019 .............. F16L 59/02 |

OTHER PUBLICATIONS

Translation (Year: 2019).*
U.S. Appl. No. 17/986,625, filed Nov. 14, 2022.
U.S. Appl. No. 18/384,570, filed Oct. 27, 2023.
U.S. Appl. No. 17/705,764, filed Mar. 28, 2022.
U.S. Office Action dated May 28, 2024 issued in U.S. Appl. No. 18/384,570.
U.S. Notice of Allowance dated Oct. 23, 2023 issued in U.S. Appl. No. 17/705,764.
Chinese Office Action dated Feb. 7, 2024 issued in Application No. 202210685871.6.
Australian Office Action dated Apr. 4, 2024 issued in Application No. 2022215241.
Korean Office Action dated Sep. 18, 2023 issued in Application No. 10-2023-0058225.
Australian Office Action dated Nov. 8, 2023 issued in Application No. 2022221530.
U.S. Appl. No. 18/419,927, filed Jan. 23, 2024.
International Search Report (with English Translation) and Written Opinion dated Mar. 20, 2019 issued in Application No. PCT/KR2018/015710.
Russian Office Action dated Mar. 30, 2021 issued in Application 2020122677/10(039004).
International Search Report and Written Opinion dated Mar. 20, 2019 issued in Application No. PCT/KR2018/015703.
International Search Report and Written Opinion dated Mar. 20, 2019 issued in Application No. PCT/KR2018/015706.
International Search Report and Written Opinion dated Mar. 20, 2019 issued in Application No. PCT/KR2018/015709.
International Search Report and Written Opinion dated Mar. 28, 2019 issued in Application No. PCT/KR2018/015713.
Russian Office Action dated Apr. 20, 2021 issued in RU Application No. 2020122682/10(039009).
Russian Office Action dated Apr. 20, 2021 issued in RU Application No. 2020122685/10(039012).
U.S. Office Action dated Jul. 1, 2021 issued in co-pending related U.S. Appl. No. 16/766,233.
Russian Office Action dated May 11, 2021 issued in Application 2020122686/10(039013).
U.S. Office Action dated Sep. 28, 2021 issued in co-pending related U.S. Appl. No. 16/766,562.
European Search Report dated Jul. 22, 2021 issued in EP Application No. 18888053.8.
Chinese Office Action dated Aug. 23, 2021 issued in CN Application No. 201880081068.3.
European Search Report dated Jul. 29, 2021 issued in Application No. 18889271.5.
Chinese Office Action dated Jul. 28, 2021 issued in Application No. 201880080796.2.
Chinese Office Action dated Aug. 4, 2021 issued in Application No. 201880080831.0.
European Search Report dated Jul. 29, 2021 issued in Application No. 18887635.3.
U.S. Office Action dated Oct. 28, 2021 issued in U.S. Appl. No. 16/766,215.
European Search Report dated Aug. 9, 2021 issued in EP Application No. 18889452.1.
Chinese Office Action dated Aug. 20, 2021 issued in CN Application No. 201880080785.4.
Chinese Office Action dated Sep. 2, 2021 issued in CN Application No. 201880080793.9.
U.S. Notice of Allowance dated Dec. 27, 2021 issued in co-pending related U.S. Appl. No. 16/768,379.
Common Knowledge: 8.5.2 Installation of VFD and Connection Between Motor and PLCVFD (Apr. 22, 2022).
Chinese Office Action dated Apr. 28, 2022 issued in CN Application No. 201880081068.3.
Indian Office Action dated May 20, 2022 issued in Application 202017024179.
Korean Notice of Allowance dated Aug. 8, 2022 issued in Application 10-2017-0171630.
U.S. Office Action dated Oct. 6, 2022 issued in parent U.S. Appl. No. 16/767,899.
U.S. Office Action dated Nov. 7, 2022 issued in co-pending related U.S. Appl. No. 17/555,733.
U.S. Office Action dated Feb. 21, 2023 issued in co-pending related U.S. Appl. No. 17/555,733.
U.S. Final Office Action dated Feb. 24, 2023 issued in parent U.S. Appl. No. 16/767,899.
U.S. Office Action dated Mar. 31, 2023 issued in U.S. Appl. No. 17/705,764.
Chinese Office Action dated Apr. 26, 2023 issued in Application No. 202210685871.6.
Chinese Office Action dated Apr. 29, 2023 issued in Application No. 202210306278.6.
European Office Action dated Jul. 12, 2023 issued in Application No. 18889271.5.
Korean Notice of Allowance dated May 19, 2023 issued in Application No. 10-2017-0171661.
U.S. Appl. No. 17/957,503, filed Sep. 30, 2022.
U.S. Appl. No. 17/555,733, filed Dec. 20, 2021.
Korean Office Action dated Sep. 6, 2023 issued in Application No. 10-2023-0106442.
Australian Office Action dated Sep. 28, 2023 issued in Application No. 2022215219.

(56) References Cited

OTHER PUBLICATIONS

Korean Office Action dated Sep. 4, 2023 issued in Application No. 10-2023-0032773.

* cited by examiner (a)

(b)

(c)

VACUUM ADIABATIC BODY AND REFRIGERATOR

CROSS-REFERENCE TO RELATED APPLICATIONS

This application is a Continuation application of prior U.S. patent application Ser. No. 16/767,899 filed May 28, 2020, which application is a U.S. National Stage Application under 35 U.S.C. § 371 of PCT Application No. PCT/KR2018/015710, filed Dec. 11, 2018, which claims priority to Korean Patent Application No. 10-2017-0171661, filed Dec. 13, 2017, whose entire disclosures are hereby incorporated by reference.

BACKGROUND

1. Field

The present invention relates to a vacuum adiabatic body and a refrigerator.

2. Background

A vacuum adiabatic body is a product for suppressing heat transfer by vacuuming the interior of a body thereof. The vacuum adiabatic body can reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more is generally provided. However, the internal volume of the refrigerator is therefore reduced.

In order to increase the internal volume of a refrigerator, there is an attempt to apply a vacuum adiabatic body to the refrigerator.

First, Korean Patent No. 10-0343719 (Reference Document 1) of the present applicant has been disclosed. According to Reference Document 1, there is disclosed a method in which a vacuum adiabatic panel is prepared and then built in walls of a refrigerator, and the exterior of the vacuum adiabatic panel is finished with a separate molding as Styrofoam (polystyrene). According to the method, additional foaming is not required, and the adiabatic performance of the refrigerator is improved. However, fabrication cost is increased, and a fabrication method is complicated.

As another example, a technique of providing walls using a vacuum adiabatic material and additionally providing adiabatic walls using a foam filling material has been disclosed in Korean Patent Publication No. 10-2015-0012712 (Reference Document 2). According to Reference Document 2, fabrication cost is increased, and a fabrication method is complicated.

As another example, there is an attempt to fabricate all walls of a refrigerator using a vacuum adiabatic body that is a single product. For example, a technique of providing an adiabatic structure of a refrigerator to be in a vacuum state has been disclosed in U.S. Patent Laid-Open Publication No. US2040226956A1 (Reference Document 3). However, it is difficult to obtain an adiabatic effect of a practical level by providing the walls of the refrigerator to be in a sufficient vacuum state. Specifically, it is difficult to prevent heat transfer at a contact portion between external and internal cases having different temperatures. Further, it is difficult to maintain a stable vacuum state. Furthermore, it is difficult to prevent deformation of the cases due to a sound pressure in the vacuum state. Due to these problems, the technique of Reference Document 3 is limited to cryogenic refrigerating apparatuses, and is not applied to refrigerating apparatuses used in general households.

As a further alternative, the applicant of the present invention has applied Korean Patent Application Publication No. 10-2017-0016187, a vacuum adiabatic body and a refrigerator.

The present cited invention proposes to configure a single cooling space using a single vacuum adiabatic body. However, in an actual refrigerator, a plurality of storage chambers having different temperatures must be provided, but, in the related art, there is a problem that it is not considered.

BRIEF DESCRIPTION OF THE DRAWINGS

The embodiments will be described in detail with reference to the following drawings in which like reference numerals refer to like elements wherein.

DETAILED DESCRIPTION

Figure 1:
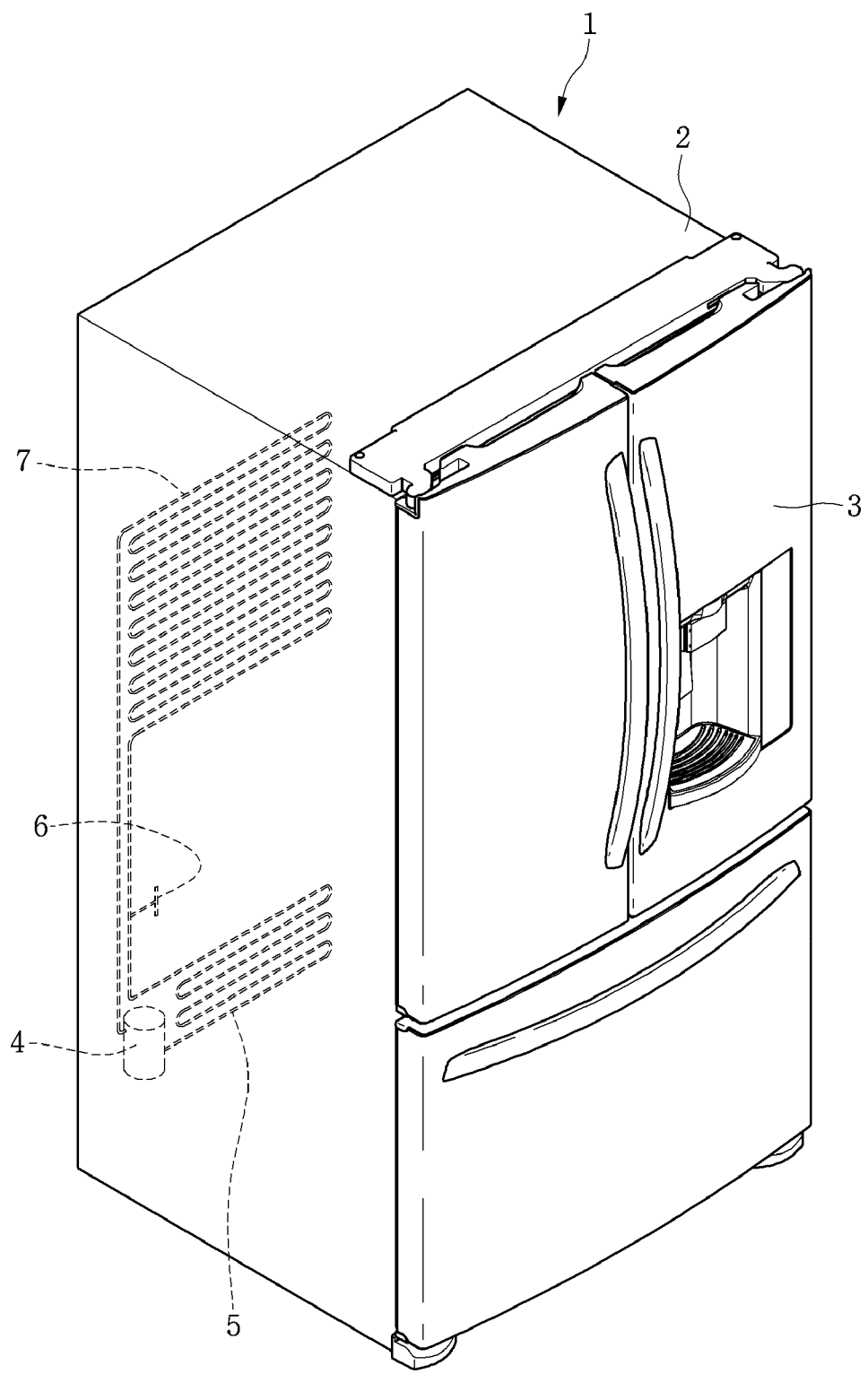
FIG. 1 is a perspective view of a refrigerator according to an embodiment.

Hereinafter, specific embodiments of the present invention are proposed with reference to the drawings. However, there is no intention to limit the idea of the invention to the embodiments described below, a person skilled in the art which understands the idea of the present invention can easily propose other embodiments included within the scope of the same idea by adding, changing, and deleting constituent elements, or the like, but it will be understood that other embodiments are also included within the scope of the present invention.

Hereinafter, the drawings presented for the explanation of the embodiments may simply display parts which differ from the actual products, be exaggerated, simple, or detailed, however, this is to facilitate the understanding of the technical idea of the present invention, and should not be construed as being limited to sizes, structures, and shapes illustrated in the drawings. However, preferably, the actual shape may be illustrated as much as possible.

In the following embodiments, unless the embodiments do not collide with each other, the description of any one embodiment may be applied to the description of another embodiment, and some configurations of any one embodiment may be applied to another configuration in a state where only a specific portion thereof is modified.

In the following description, the term 'vacuum pressure' means a certain pressure state lower than atmospheric pressure. In addition, the expression that a vacuum degree of A is higher than that of B means that a vacuum pressure of A is lower than that of B.

FIG. 1 is a perspective view of a refrigerator according to an embodiment.

Referring to FIG. 1, the refrigerator 1 includes a main body 2 provided with a cavity 9 capable of storing storage goods and a door 3 provided to open/close the main body 2. The door 3 may be rotatably or movably disposed to open/close the cavity 9. The cavity 9 may provide at least one of a refrigerating chamber and a freezing chamber.

Parts constituting a freezing cycle in which cold air is supplied into the cavity 9. Specifically, the parts include a compressor 4 for compressing a refrigerant, a condenser 5 for condensing the compressed refrigerant, an expander 6 for expanding the condensed refrigerant, and an evaporator 7 for evaporating the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

Figure 2:
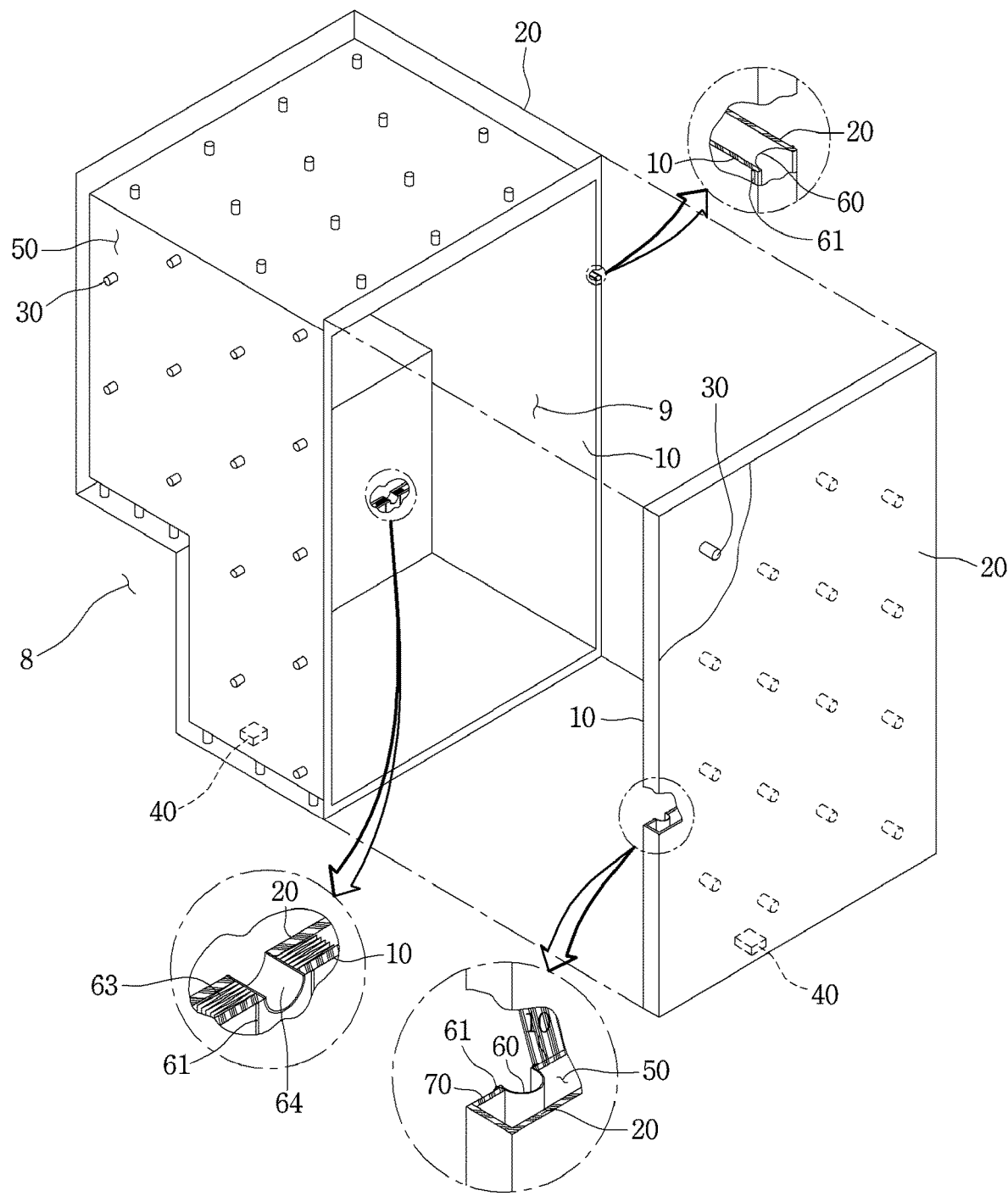
FIG. 2 is a view schematically showing a vacuum adiabatic body used in a main body and a door of the refrigerator.

FIG. 2 is a view schematically showing a vacuum adiabatic body used in the main body and the door of the refrigerator. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets are provided are schematically illustrated for convenience of understanding.

Referring to FIG. 2, the vacuum adiabatic body includes a first plate member 10 for providing a wall of a low-temperature space, a second plate member 20 for providing a wall of a high-temperature space, a vacuum space part 50 defined as a gap part between the first and second plate members 10 and 20. Also, the vacuum adiabatic body includes the conductive resistance sheets 60 and 63 for preventing heat conduction between the first and second plate members 10 and 20. A sealing part 61 for sealing the first and second plate members 10 and 20 is provided such that the vacuum space part 50 is in a sealing state. When the vacuum adiabatic body is applied to a refrigerating or heating cabinet, the first plate member 10 may be referred to as an inner case, and the second plate member 20 may be referred to as an outer case. A machine chamber 8 in which parts providing a freezing cycle are accommodated is placed at a lower rear side of the main body-side vacuum adiabatic body, and an exhaust port 40 for forming a vacuum state by exhausting air in the vacuum space part is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space.

Factors of heat transfer, which cause loss of the adiabatic effect of the vacuum adiabatic body, are heat conduction between the first and second plate members 10 and 20, heat radiation between the first and second plate members 10 and and gas conduction of the vacuum space part 50.

Hereinafter, a heat resistance unit provided to reduce adiabatic loss related to the factors of the heat transfer will be provided. Meanwhile, the vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

Figure 3:
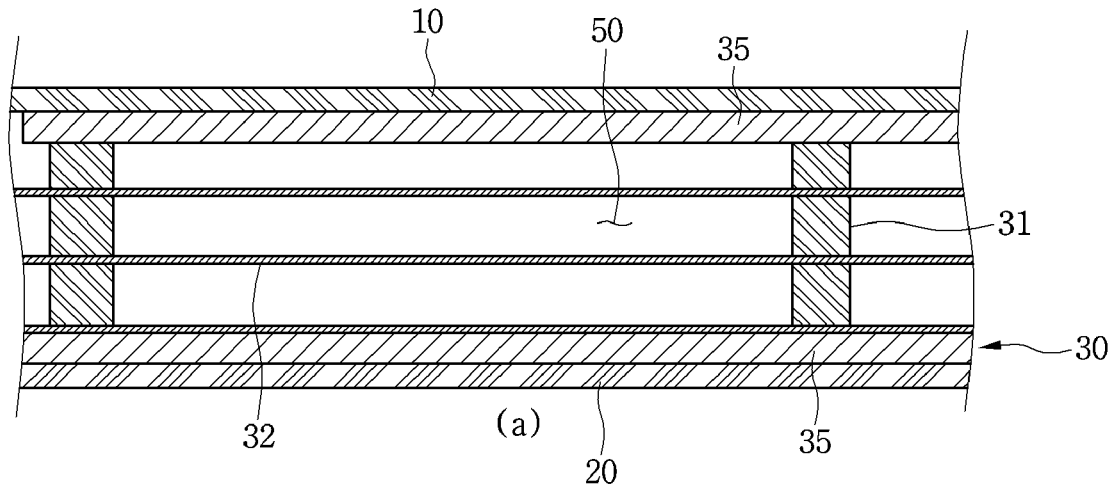
FIG. 3 is a view showing various embodiments of an internal configuration of a vacuum space part.
Figure 3:
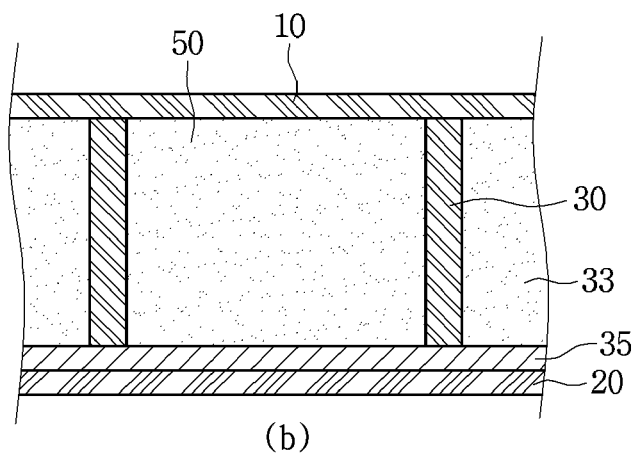
Figure 3:
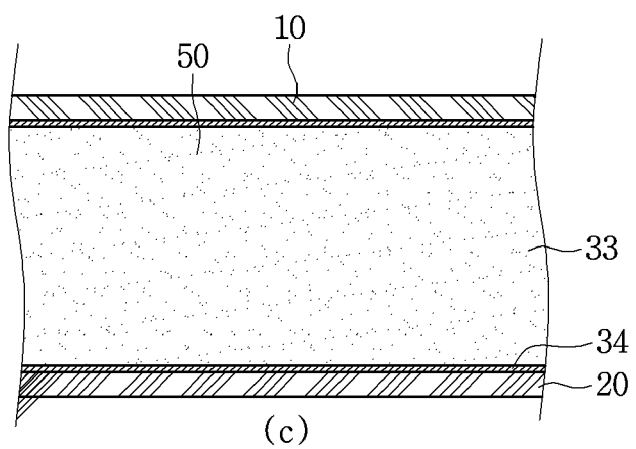

FIG. 3 is a view showing various embodiments of an internal configuration of the vacuum space part.

First, referring to FIG. 3a, the vacuum space part 50 is provided in a third space having a different pressure from the first and second spaces, preferably, a vacuum state, thereby reducing adiabatic loss. The third space may be provided at a temperature between the temperature of the first space and the temperature of the second space. Since the third space is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, adiabatic loss may be caused due to an increase in amount of heat radiation, caused by the contraction of the vacuum space part 50, and an increase in amount of heat conduction, caused by contact between the plate members 10 and 20.

A supporting unit 30 may be provided to reduce the deformation of the vacuum space part 50. The supporting unit 30 includes bars 31. The bars 31 may extend in a direction substantially vertical to the first and second plate members 10 and so as to support a distance between the first and second plate members 10 and 20. A support plate 35 may be additionally provided to at least one end of the bar 31. The support plate 35 connects at least two bars 31 to each other, and may extend in a direction horizontal to the first and second plate members 10 and 20. The support plate may be provided in a plate shape, or may be provided in a lattice shape such that its area contacting the first or second plate member 10 or 20 is decreased, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 can be diffused through the support plate 35.

A material of the supporting unit 30 may include a resin selected from the group consisting of PC, glass fiber PC, low outgassing PC, PPS, and LCP so as to obtain high compressive strength, low outgassing and water absorptance, low thermal conductivity, high compressive strength at high temperature, and excellent machinability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be preferably used as the material of the radiation resistance sheet 32. In an embodiment, an aluminum foil having an emissivity of 0.02 may be used as the radiation resistance sheet 32. Since the transfer of radiation heat cannot be sufficiently blocked using one radiation resistance sheet, at least two radiation resistance sheets 32 may be provided at a certain distance so as not to contact each other. In addition, at least one radiation resistance sheet may be provided in a state in which it contacts the inner surface of the first or second plate member 10 or 20.

Referring to FIG. 3b, the distance between the plate members is maintained by the supporting unit 30, and a porous substance 33 may be filled in the vacuum space part 50. The porous substance 33 may have a higher emissivity than the stainless material of the first and second plate members 10 and 20. However, since the porous substance 33 is filled in the vacuum space part 50, the porous substance 33 has a high efficiency for resisting the radiation heat transfer.

In this embodiment, the vacuum adiabatic body can be fabricated without using the radiation resistance sheet 32.

Referring to FIG. 3c, the supporting unit 30 maintaining the vacuum space part 50 is not provided. Instead of the supporting unit 30, the porous substance 33 is provided in a state in which it is surrounded by a film 34. In this case, the porous substance 33 may be provided in a state in which it is compressed so as to maintain the gap of the vacuum space part 50. The film 34 is made of, for example, a PE material, and may be provided in a state in which holes are formed therein.

In this embodiment, the vacuum adiabatic body can be fabricated without using the supporting unit 30. In other words, the porous substance 33 can simultaneously serve as the radiation resistance sheet 32 and the supporting unit 30.

A case where the porous substance 33 is filled in the vacuum space part 50 will be described in detail later.

Figure 4:
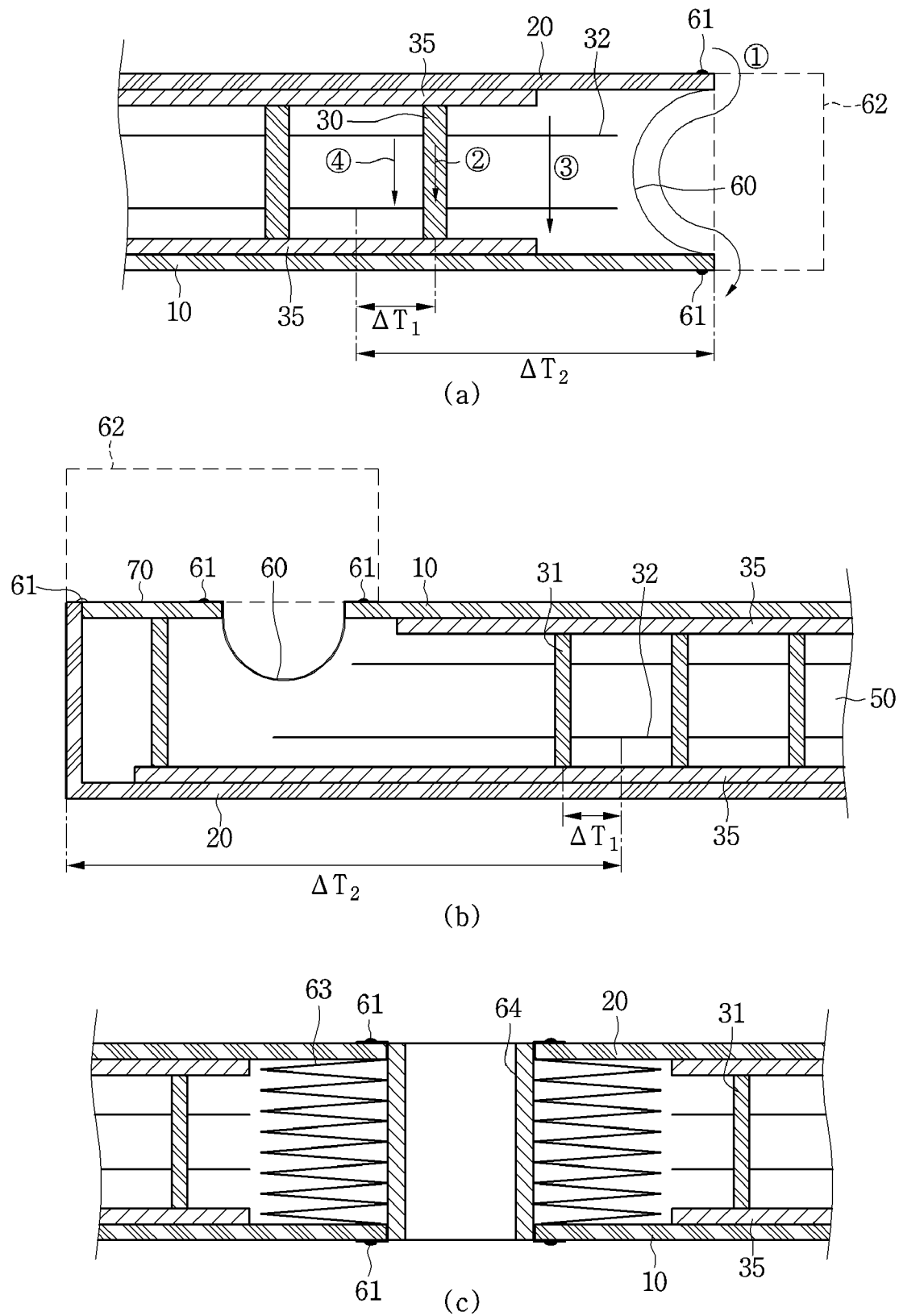
FIG. 4 is a view showing various embodiments of conductive resistance sheets and peripheral parts thereof.

FIG. 4 is a view showing various embodiments of the conductive resistance sheets and peripheral parts thereof. Structures of the conductive resistance sheets are briefly illustrated in FIG. 2, but will be understood in detail with reference to FIG. 4.

First, a conductive resistance sheet proposed in FIG. 4a may be preferably applied to the main body-side vacuum adiabatic body. Specifically, the first and second plate members 10 and 20 are to be sealed so as to vacuum the interior of the vacuum adiabatic body. In this case, since the two plate members have different temperatures from each other, heat transfer may occur between the two plate members. A conductive resistance sheet 60 is provided to prevent heat conduction between two different kinds of plate members.

The conductive resistance sheet 60 may be provided with sealing parts 61 at which both ends of the conductive resistance sheet 60 are sealed to defining at least one portion of the wall for the third space and maintain the vacuum state. The conductive resistance sheet 60 may be provided as a thin foil in unit of micrometer so as to reduce the amount of heat conducted along the wall for the third space. The sealing parts 61 may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as cocking. The conductive resistance sheet 60 may be provided in a curved shape. Thus, a heat conduction distance of the conductive resistance sheet 60 is provided longer than the linear distance of each plate member, so that the amount of heat conduction can be further reduced.

A change in temperature occurs along the conductive resistance sheet 60. Therefore, in order to block heat transfer to the exterior of the conductive resistance sheet 60, a shielding part 62 may be provided at the exterior of the conductive resistance sheet 60 such that an adiabatic action occurs. In other words, in the refrigerator, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur. In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous substance contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body and the door are opened, the shielding part 62 may be preferably provided as a porous substance or a separate adiabatic structure.

A conductive resistance sheet proposed in FIG. 4b may be preferably applied to the door-side vacuum adiabatic body. In FIG. 4b, portions different from those of FIG. 4a are described in detail, and the same description is applied to portions identical to those of FIG. 4a. A side frame 70 is further provided at an outside of the conductive resistance sheet 60. A part for sealing between the door and the main body, an exhaust port necessary for an exhaust process, a getter port for vacuum maintenance, and the like may be placed on the side frame 70. This is because the mounting of parts is convenient in the main body-side vacuum adiabatic body, but the mounting positions of parts are limited in the door-side vacuum adiabatic body.

In the door-side vacuum adiabatic body, it is difficult to place the conductive resistance sheet 60 at a front end portion of the vacuum space part, i.e., a corner side portion of the vacuum space part. This is because, unlike the main body, a corner edge portion of the door is exposed to the exterior. More specifically, if the conductive resistance sheet 60 is placed at the front end portion of the vacuum space part, the corner edge portion of the door is exposed to the exterior, and hence there is a disadvantage in that a separate adiabatic part should be configured so as to heat-insulate the conductive resistance sheet 60.

A conductive resistance sheet proposed in FIG. 4c may be preferably installed in the pipeline passing through the vacuum space part. In FIG. 4c, portions different from those of FIGS. 4a and 4b are described in detail, and the same description is applied to portions identical to those of FIGS. 4a and 4b. A conductive resistance sheet having the same shape as that of FIG. 4a, preferably, a wrinkled conductive resistance sheet 63 may be provided at a peripheral portion of the pipeline 64. Accordingly, a heat transfer path can be lengthened, and deformation caused by a pressure difference can be prevented. In addition, a separate shielding part may be provided to improve the adiabatic performance of the conductive resistance sheet.

A heat transfer path between the first and second plate members 10 and 20 will be described with reference back to FIG. 4a. Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside the vacuum adiabatic body, gas conduction heat ③ conducted through an internal gas in the vacuum space part, and radiation transfer heat ④ transferred through the vacuum space part.

The transfer heat may be changed depending on various depending on various design dimensions. For example, the supporting unit may be changed such that the first and second plate members 10 and 20 can endure a vacuum pressure without being deformed, the vacuum pressure may be changed, the distance between the plate members may be changed, and the length of the conductive resistance sheet may be changed. The transfer heat may be changed depending on a difference in temperature between the spaces (the first and second spaces) respectively provided by the plate members. In the embodiment, a preferred configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ can become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat ④ is smaller than the heat transfer amount by the solid conduction heat but larger than the heat transfer amount of the gas conduction heat ③. For example, the heat transfer amount by the radiation transfer heat ④ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math figure 1.

$$eK_{solid\ conduction\ heat} > eK_{radiation\ transfer\ heat} > eK_{gas\ conduction\ heat}$$ Math Figure 1

Here, the effective heat transfer coefficient (eK) is a value that can be measured using a shape and temperature differences of a target product. The effective heat transfer coefficient (eK) is a value that can be obtained by measuring a total heat transfer amount and a temperature at least one portion at which heat is transferred. For example, a calorific value (W) is measured using a heating source that can be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k=QL/A\Delta T$. Here, Q denotes a calorific value (W) and may be obtained using a calorific value of a heater. A denotes a sectional area ($m^2$) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and can be obtained in advance). For the supporter conduction heat, a conductive calorific value may be obtained through a temperature difference ($\Delta T$) between an entrance and an exit of the supporting unit 30, a sectional area (A) of the supporting unit, a length (L) of the supporting unit, and a thermal conductivity (k) of the supporting unit. Here, the thermal conductivity of the supporting unit is a material property of a material and can be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous substance is provided inside the vacuum space part 50, porous substance conduction heat ⑤ may be a sum of the supporter conduction heat ② and the radiation transfer heat ④. The porous substance conduction heat ⑤ may be changed depending on various variables including a kind, an amount, and the like of the porous substance.

According to an embodiment, a temperature difference $\Delta T_1$ between a geometric center formed by adjacent bars 31 and a point at which each of the bars 31 is located may be preferably provided to be less than 0.5° C. Also, a temperature difference $\Delta T_2$ between the geometric center formed by the adjacent bars 31 and an edge portion of the vacuum adiabatic body may be preferably provided to be less than 0.5° C. In the second plate member 20, a temperature difference between an average temperature of the second plate and a temperature at a point at which a heat transfer path passing through the conductive resistance sheet 60 or 63 meets the second plate may be largest. For example, when the second space is a region hotter than the first space, the temperature at the point at which the heat transfer path passing through the conductive resistance sheet meets the second plate member becomes lowest. Similarly, when the second space is a region colder than the first space, the temperature at the point at which the heat transfer path passing through the conductive resistance sheet meets the second plate member becomes highest.

This means that the amount of heat transferred through other points except the surface conduction heat passing through the conductive resistance sheet should be controlled, and the entire heat transfer amount satisfying the vacuum adiabatic body can be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having a strength ($N/m^2$) of a certain level may be preferably used.

Under such circumferences, the plate members 10 and 20 and the side frame 70 may be preferably made of a material having a sufficient strength with which they are not damaged by even vacuum pressure. For example, when the number of bars 31 is decreased so as to limit the support conduction heat, deformation of the plate member occurs due to the vacuum pressure, which may bad influence on the external appearance of refrigerator. The radiation resistance sheet 32 may be preferably made of a material that has a low emissivity and can be easily subjected to thin film processing. Also, the radiation resistance sheet 32 is to ensure a strength enough not to be deformed by an external impact. The supporting unit 30 is provided with a strength enough to support the force by the vacuum pressure and endure an external impact, and is to have machinability. The conductive resistance sheet 60 may be preferably made of a material that has a thin plate shape and can endure the vacuum pressure.

In an embodiment, the plate member, the side frame, and the conductive resistance sheet may be made of stainless materials having the same strength. The radiation resistance sheet may be made of aluminum having a weaker strength that the stainless materials. The supporting unit may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a strength, but the stiffness of the material is preferably low so as to increase heat resistance and minimize radiation heat as the conductive resistance sheet is uniformly spread without any roughness when the vacuum pressure is applied. The radiation resistance sheet 32 requires a stiffness of a certain level so as not to contact another part due to deformation. Particularly, an edge portion of the radiation resistance sheet may generate conduction heat due to drooping caused by the self-load of the radiation resistance sheet. Therefore, a stiffness of a certain level is required. The supporting unit 30 requires a stiffness enough to endure a compressive stress from the plate member and an external impact.

In an embodiment, the plate member and the side frame may preferably have the highest stiffness so as to prevent deformation caused by the vacuum pressure. The supporting unit, particularly, the bar may preferably have the second highest stiffness. The radiation resistance sheet may preferably have a stiffness that is lower than that of the supporting unit but higher than that of the conductive resistance sheet. The conductive resistance sheet may be preferably made of a material that is easily deformed by the vacuum pressure and has the lowest stiffness.

Even when the porous substance 33 is filled in the vacuum space part 50, the conductive resistance sheet may preferably have the lowest stiffness, and the plate member and the side frame may preferably have the highest stiffness.

Hereinafter, a vacuum pressure preferably determined depending on an internal state of the vacuum adiabatic body. As already described above, a vacuum pressure is to be maintained inside the vacuum adiabatic body so as to reduce heat transfer. At this time, it will be easily expected that the vacuum pressure is preferably maintained as low as possible so as to reduce the heat transfer.

The vacuum space part may resist the heat transfer by applying only the supporting unit 30. Alternatively, the porous substance 33 may be filled together with the supporting unit in the vacuum space part 50 to resist the heat transfer. Alternatively, the vacuum space part may resist the heat transfer not by applying the supporting unit but by applying the porous substance 33.

The case where only the supporting unit is applied will be described.

Figure 5:
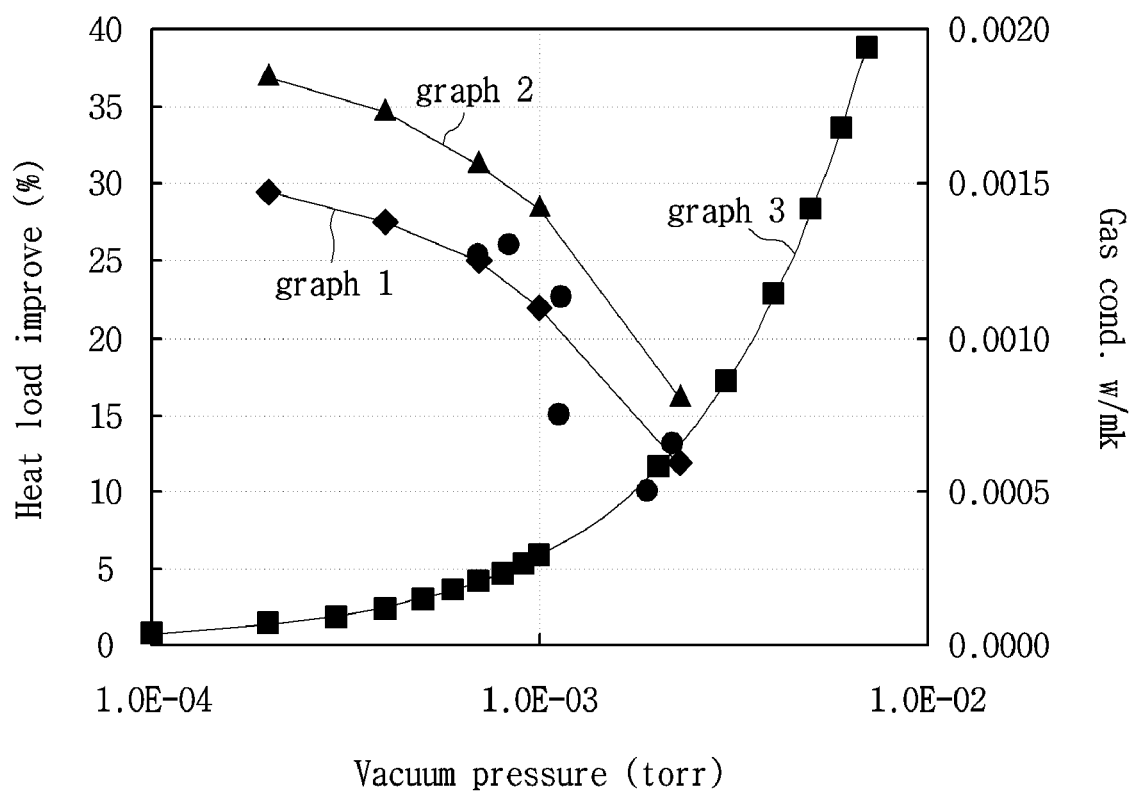
FIG. 5 illustrates graphs showing changes in adiabatic performance and changes in gas conductivity with respect to vacuum pressures by applying a simulation.

FIG. 5 illustrates graphs showing changes in adiabatic performance and changes in gas conductivity with respect to vacuum pressures by applying a simulation.

Referring to FIG. 5, it can be seen that, as the vacuum pressure is decreased, i.e., as the vacuum degree is increased, a heat load in the case of only the main body (Graph 1) or in the case where the main body and the door are joined together (Graph 2) is decreased as compared with that in the case of the typical product formed by foaming polyurethane, thereby improving the adiabatic performance. However, it can be seen that the degree of improvement of the adiabatic performance is gradually lowered. Also, it can be seen that, as the vacuum pressure is decreased, the gas conductivity (Graph 3) is decreased. However, it can be seen that, although the vacuum pressure is decreased, the ratio at which the adiabatic performance and the gas conductivity are improved is gradually lowered. Therefore, it is preferable that the vacuum pressure is decreased as low as possible. However, it takes long time to obtain excessive vacuum pressure, and much cost is consumed due to excessive use of a getter. In the embodiment, an optimal vacuum pressure is proposed from the above-described point of view.

Figure 6:
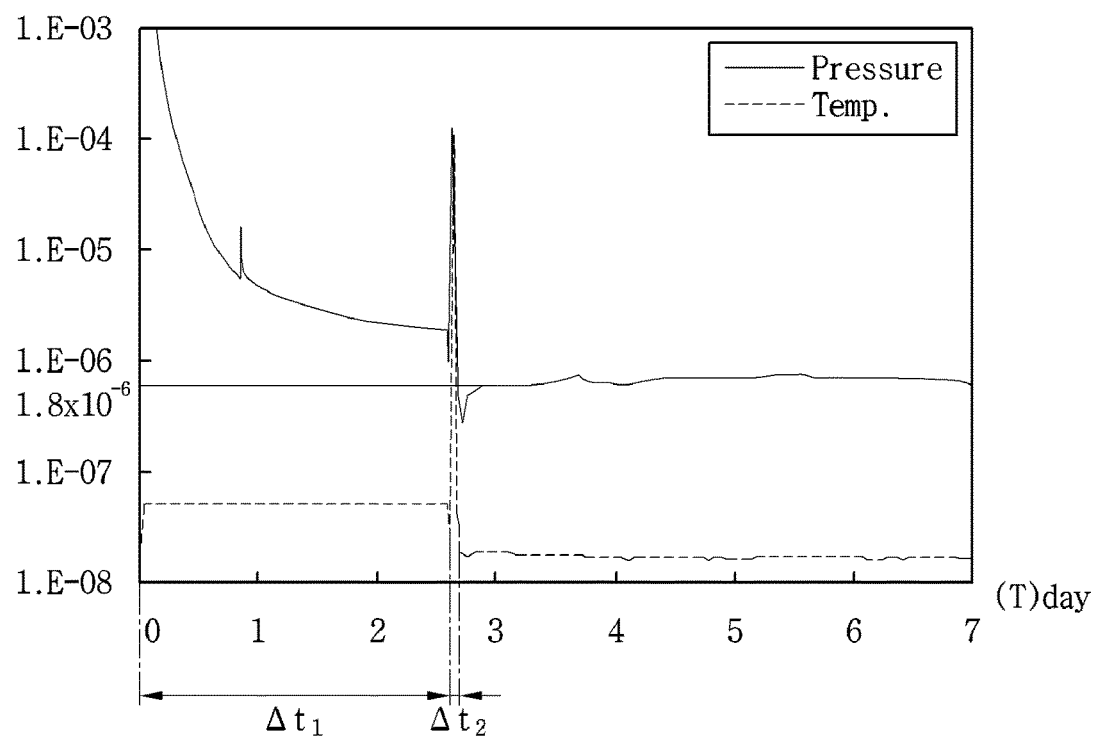
FIG. 6 illustrates graphs obtained by observing, over time and pressure, a process of exhausting the interior of the vacuum adiabatic body when a supporting unit is used.

FIG. 6 illustrates graphs obtained by observing, over time and pressure, a process of exhausting the interior of the vacuum adiabatic body when the supporting unit is used.

Referring to FIG. 6, in order to create the vacuum space part 50 to be in the vacuum state, a gas in the vacuum space part 50 is exhausted by a vacuum pump while evaporating a latent gas remaining in the parts of the vacuum space part 50 through baking. However, if the vacuum pressure reaches a certain level or more, there exists a point at which the level of the vacuum pressure is not increased any more ($\Delta t1$). After that, the getter is activated by disconnecting the vacuum space part 50 from the vacuum pump and applying heat to the vacuum space part 50 ($\Delta t2$). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8 \times 10^{-6}$ Torr.

In the embodiment, a point at which the vacuum pressure is not substantially decreased any more even though the gas is exhausted by operating the vacuum pump is set to the lowest limit of the vacuum pressure used in the vacuum adiabatic body, thereby setting the minimum internal pressure of the vacuum space part 50 to $1.8 \times 10^{-6}$ Torr.

Figure 7:
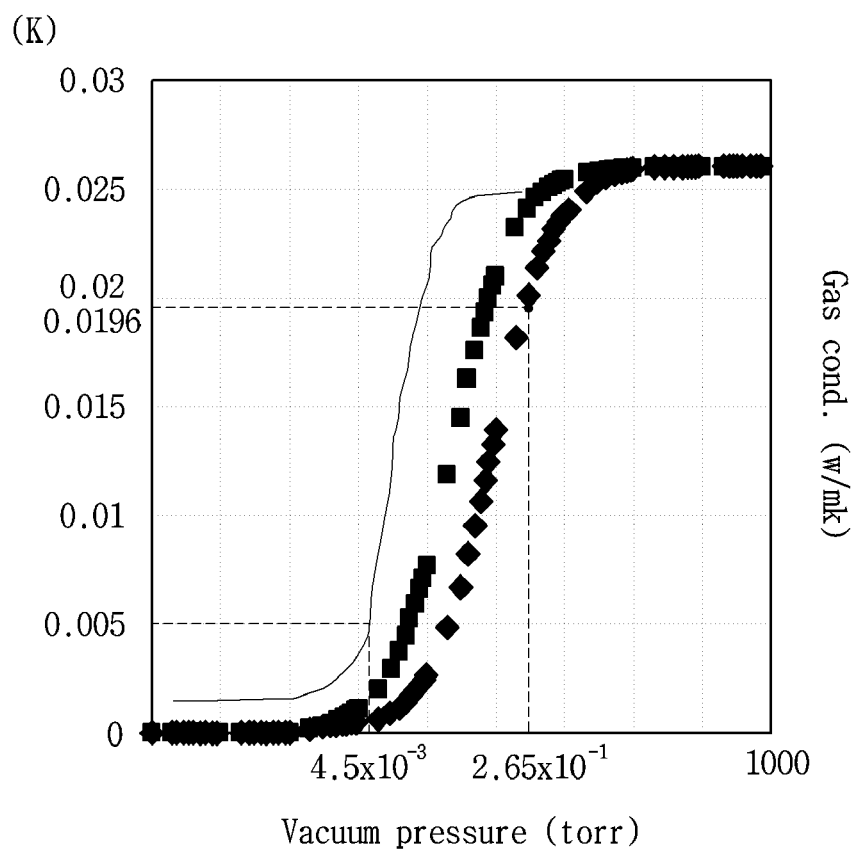
FIG. 7 illustrates graphs obtained by comparing vacuum pressures and gas conductivities.

FIG. 7 illustrates graphs obtained by comparing vacuum pressures and gas conductivities.

Referring to FIG. 7, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside vacuum space part 50, the gap is a distance between the radiation resistance sheet 32 and the plate member adjacent thereto. When the radiation resistance sheet 32 does not exist inside vacuum space part 50, the gap is a distance between the first and second plate members.

It can be seen that, since the size of the gap is small at a point corresponding to a typical effective heat transfer coefficient of 0.0196 W/mK, which is provided to a adiabatic material formed by foaming polyurethane, the vacuum pressure is $2.65 \times 10^{-1}$ Torr even when the size of the gap is 2.76 mm. Meanwhile, it can be seen that the point at which reduction in adiabatic effect caused by gas conduction heat is saturated even though the vacuum pressure is decreased is a point at which the vacuum pressure is approximately $4.5 \times 10^{-3}$ Torr. The vacuum pressure of $4.5 \times 10^{-3}$ Torr can be defined as the point at which the reduction in adiabatic effect caused by gas conduction heat is saturated. Also, when the effective heat transfer coefficient is 0.1 W/mK, the vacuum pressure is $1.2 \times 10^{-2}$ Torr.

When the vacuum space part 50 is not provided with the supporting unit but provided with the porous substance, the size of the gap ranges from a few micrometers to a few hundreds of micrometers. In this case, the amount of radiation heat transfer is small due to the porous substance even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{-4}$ Torr. Also, the vacuum pressure at the point at which the reduction in adiabatic effect caused by gas conduction heat is saturated is approximately $4.7 \times 10^{-2}$ Torr. Also, the pressure where the reduction in adiabatic effect caused by gas conduction heat reaches the typical effective heat transfer coefficient of 0.0196 W/mK is 730 Torr.

In a case where the supporting unit and the porous material are provided together in the vacuum space part, an intermediate vacuum pressure between a case of using only the supporting unit and a case of using only the porous material may be created and used. In a case where only the porous material is used, the lowest vacuum pressure can be created and used.

Hereinafter, a detailed configuration of a refrigerator to which the vacuum adiabatic body as described above is applied will be described.

In the refrigerator according to the present embodiment, two independent vacuum adiabatic bodies can be applied to a single refrigerator. Here, the independent vacuum adiabatic bodies may mean that the first accommodation space in which one vacuum adiabatic body is provided can be provided differently from the second accommodation space in which the other vacuum adiabatic body is provided at temperatures in the accommodation space. More specifically, a main body-side vacuum adiabatic body having an opening for allowing entry and exit of the product and an accommodation space for the product provides a single accommodation space, and the two main body-side vacuum adiabatic bodies are coupled to each other to provide a single refrigerator.

Figure 8:
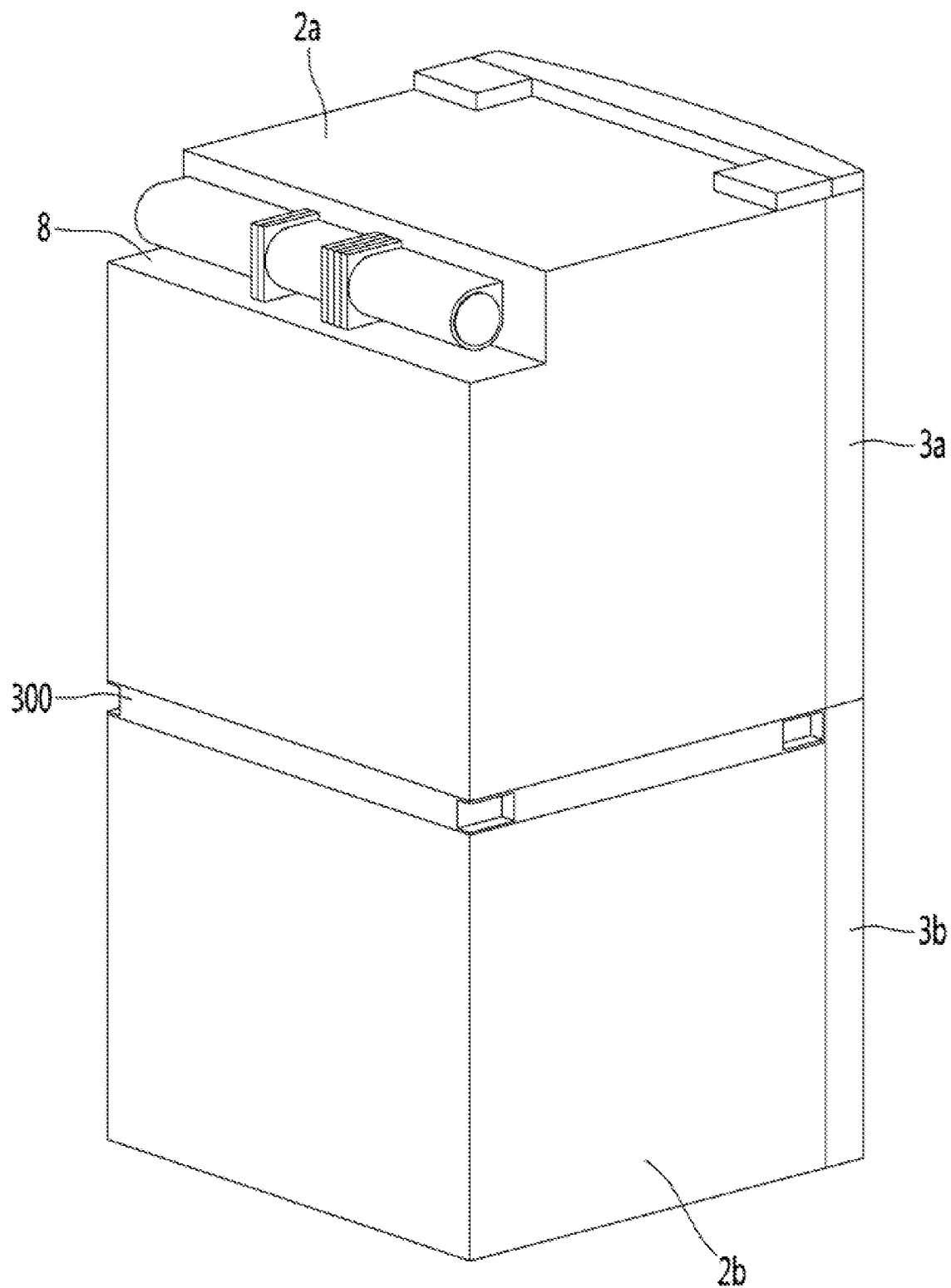
FIG. 8 is a rear perspective view illustrating a refrigerator in which a vacuum adiabatic body is used.

FIG. 8 is a rear perspective view illustrating a refrigerator in which a vacuum adiabatic body is used.

Referring to FIG. 8, the refrigerator according to the embodiment includes a first main body 2a which is provided as a first vacuum adiabatic body and has a first opening and a first accommodation space; a first door 3a which is capable of opening and closing an opening of the first main body 2a placed on the upper part; a second main body 2b which is provided as a second vacuum adiabatic body and has a second opening and a second accommodation space; a second door 3b which is capable of opening and closing an opening of the second main body 2a placed on the lower part; and a mullion 300 which is provided at a boundary part between the first main body 2a and the second main body 2b. The doors 3a and 3b may or may not be provided as vacuum adiabatic bodies as in the main bodies 2a and 2b.

Since both the first main body and the second main body are provided as a vacuum adiabatic body, a plurality of members including a first plate member and the second plate member as described above may be applied to the first main body. Similarly, the second main body may be provided with a third plate member corresponding to the first plate member, and a fourth plate member corresponding to the second plate member.

Except for structural differences or special differences between the first main body and the second main body, both can be provided in the same configuration. The sealing portion may likewise have the first sealing portion of the first main body and the second sealing portion of the second main body. In addition, the same is true for a large number of parts such as a supporting unit, a thermal resistance unit, and a port.

The mullion 300 is a configuration which is provided outside the vacuum adiabatic body providing the main bodies 2a and 2b and is independent of the temperature control condition in which the main bodies 2a and 2b are formed.

The main body 2a and 2b are stacked vertically and the mullion 300 can be provided at the contact part of the main body 2a and 2b as separate products which are separated from the main bodies 2a and 2b. The separate products which are separated from the main bodies 2a and 2b may mean the manufacturing process of the main body 2a and 2b provided as the vacuum adiabatic body and the manufacturing process of the mullion 300 are independent of each other and the main bodies 2a and 2b and the mullion 300 are manufactured as different products and then assembled in the final process.

The machine chamber 8 is illustrated as being provided at the rear upper end part of the first main body 2a, but is not limited thereto, and may be provided at the rear lower end part of the second main body 2b.

In this embodiment, the mullion 300 can perform the function of fastening the vacuum adiabatic bodies providing the respective main bodies 2a and 2b to each other, and the function of providing a predetermined gap in order that the main bodies 2a and 2b do not affect each other.

Since the main bodies 2a and 2b are provided in a stacked structure, respectively, the first main body 2a may be referred to as an upper main body and the second main body 2b may be referred to as a lower main body. Therefore, for the convenience of explanation, the first main body 2a may be referred to as an upper main body and the second main body 2b may be referred to as a lower main body. However, the idea of the present invention may include not only the configuration in which the main body is divided into the upper and lower parts but also the various configurations such as the arrangement of the right and left sides, the inclining arrangement, the mosaic arrangement, or the like. Likewise, three or more separate bodies, beyond two, may be provided in a state of being fastened to each other by the mullion. However, a preferred embodiment is provided such that the first main body of the upper and the second main body of the lower are fastened to each other.

Figure 9:
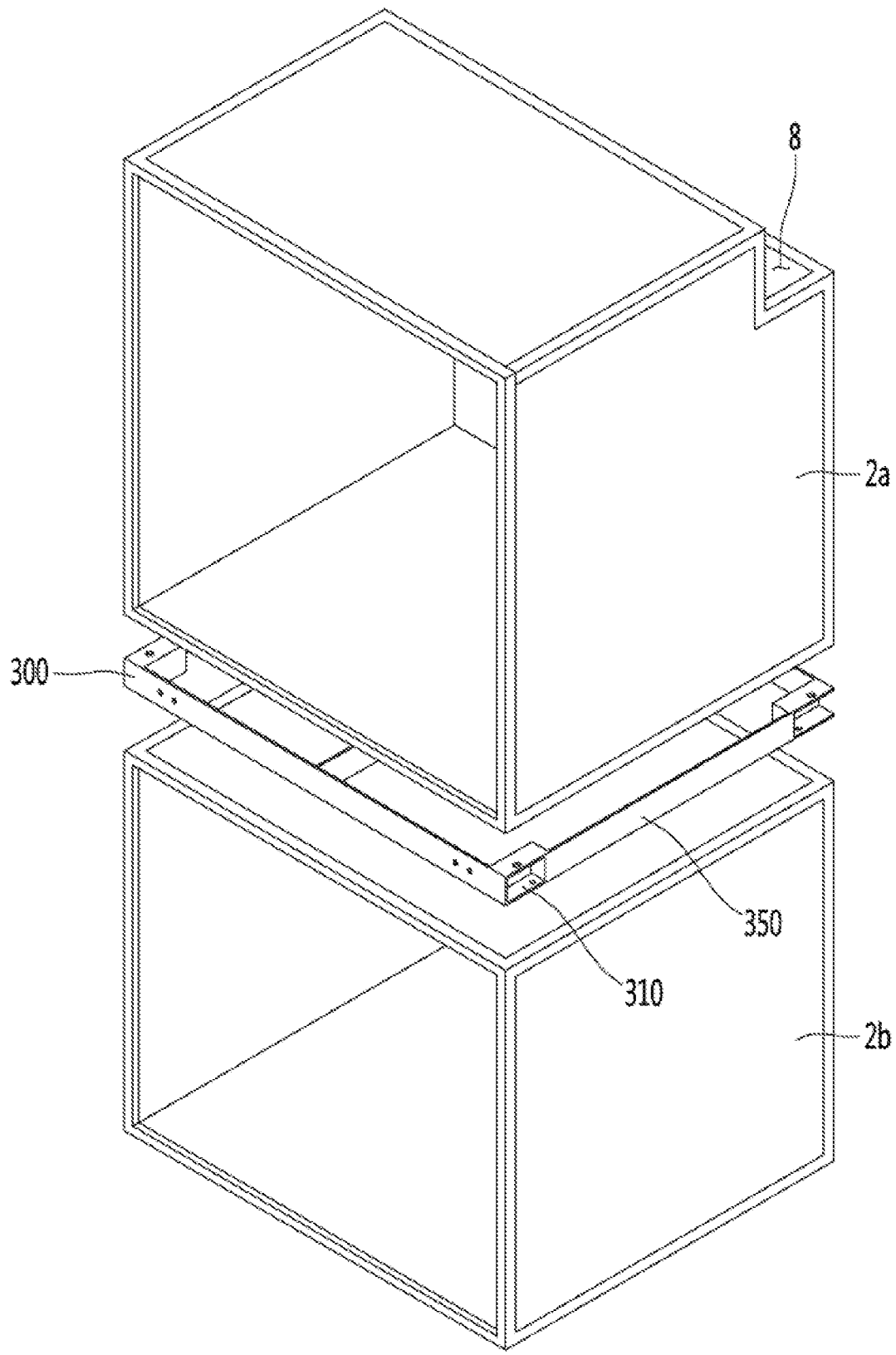
FIG. 9 is an exploded perspective view illustrating by exploding a mullion and a main body of a refrigerator according to an embodiment of the present invention.

FIG. 9 is an exploded perspective view illustrating a mullion and a main body of a refrigerator according to an embodiment of the present invention.

Referring to FIG. 9, a mullion 300 is provided at the boundary part of the main body 2a and 2b and the mullion 300 may include a supporting block 310 and a panel member 350. The supporting block 310 may be provided at each vertex portion of a two-dimensional flat surface constituting a boundary part of the main bodies 2a and 2a.

The supporting block 310 is not limited to a hexahedron shape as illustrated but may be provided in various shapes such as a rib, a supporting plate, and a column. The height of the supporting block 310 may provide a gap between the main bodies 2a and 2b so that the main bodies 2a and 2b do not affect each other. The main bodies 2a and 2b can be firmly fastened to each other by the supporting block 310. The supporting block 310 may not be provided on the entire outer surfaces of the main bodies 2a and 2b but may be fixed only at some point.

The panel member 350 may close the opening between the supporting blocks 310. The panel member 350 may allow parts accommodated in the mullion 300 to operate without external influences. The panel member 350 may be configured to fasten parts necessary for the operation of the refrigerator. The panel member 350 can divide the space of the mullion 300.

Figure 10:
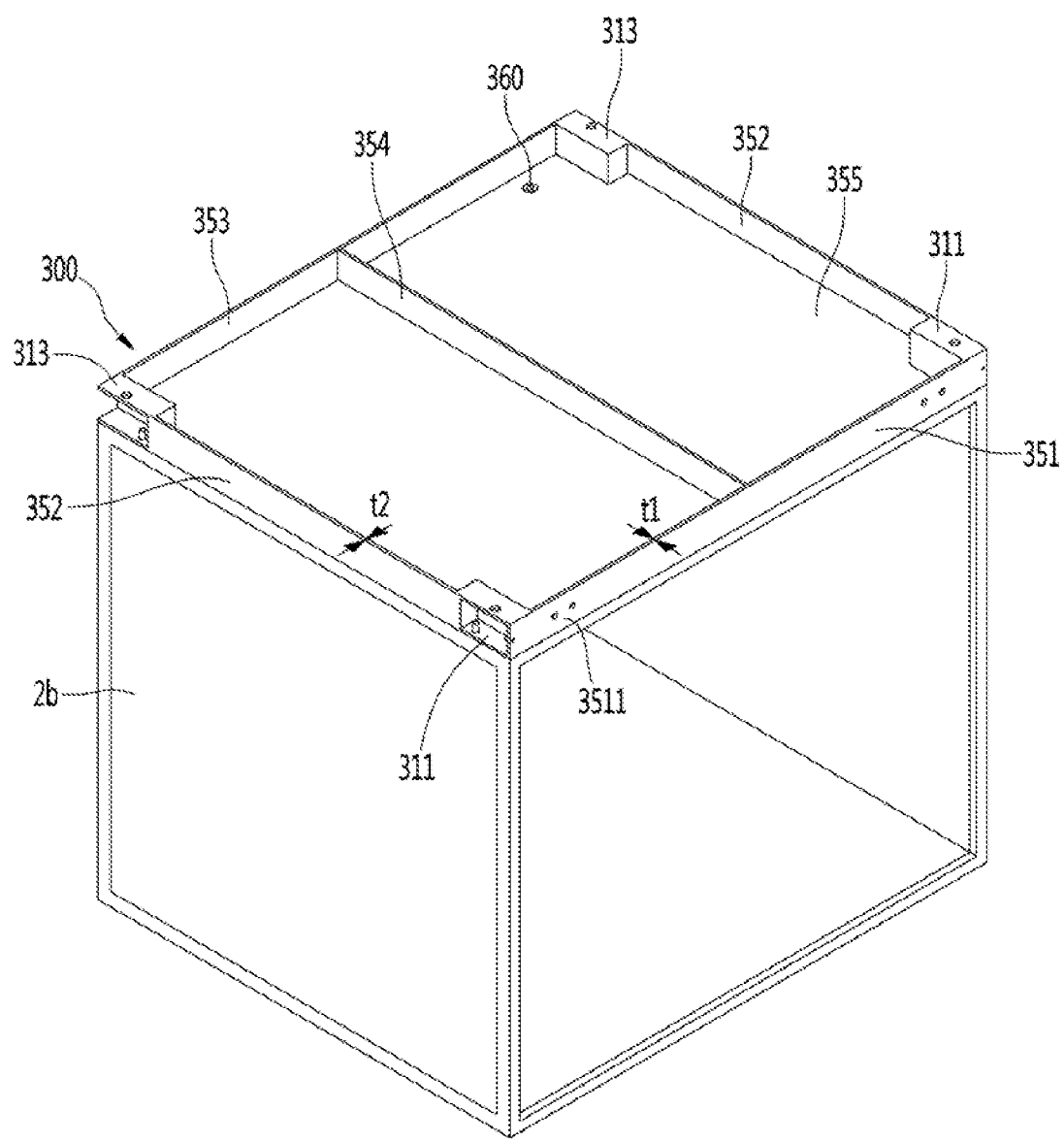
FIG. 10 is a perspective view illustrating a state where the mullions are stacked on the second main body.

FIG. 10 is a perspective view illustrating a state where the mullions are stacked on the second main body, and a detailed configuration of the mullion will be described with reference to FIG. 10.

Referring to FIG. 10, the supporting block 310 may include two front supporting blocks 311 and two rear supporting blocks 313, which are placed forward and rearward based on the direction of the refrigerator. The panel member 350 includes a front panel 351 which is placed forward based on the direction of the refrigerator, a rear panel 353 which is placed rearward based on the direction of the refrigerator, and a side panel 352 which is placed laterally based on the direction of the refrigerator. A division panel 354 which divides a space formed inside the front panel 351, the rear panel 352, and the side panel 352. A bottom panel 355 may be provided on the bottom surface of the mullion 300. The bottom panel 355 is a panel that divides the second main body 2b and the mullions 300 so that the action of the mullions 300 does not affect the second main body 2b. As a member similar to the bottom panel 355, a top panel can be provided in a gap part between the first main body 2a and the mullions 300, and the function thereof is the same as the function of the bottom panel. In the following description, the description of the bottom panel 355 can be applied to the top panel as well, unless otherwise indicated.

Each configuration of the mullion will be described in more detail.

The side panels 352 and the rear panel 353 may be formed so that the side and rear of the refrigerator are closed with respect to the outside. The side panel 352 and the rear panel 353 may be fastened to the supporting block 310.

The front panel 351 allows the front part of the mullion 300 to be shielded from the outside. The front panel 351 may be fastened to the supporting block 310. At least one end part of the front panel 351 may be provided with a hinge fastening part 3511. The hinge fastening part 3511 can be fastened to the door hinge allowing the door 3a or 3b to rotate. The door hinges may be provided corresponding to the doors 3a and 3b, respectively.

The hinge fastening part 3511 may be provided with a configuration such as a groove, a boss, or a hole. The hinge fastening part 3551 can interact with the front supporting block 311. For example, it is possible to provide an action to be fastened to the boss 3117 (see FIG. 12) of the front supporting block 311. The own weight of the doors 3a and 3b is supported not only by the front panel 351 but also by the front supporting block 311 to prevent deformation due to the own weight thereof.

The thickness t1 of the front panel 351 may be thicker than the thickness t2 of the side panel 352 and the rear panel 353. Accordingly, the own weight of the door 3 can be firmly supported.

The front panel 351, the side panel 352, the bottom panel 355, and the rear panel 353 are provided in a configuration capable of being opened or drawn out so that replacement, repair, and inspection of the constituent elements placed in the mullion 300 can be performed. The front panel 351, the side panel 352, the bottom panel 355, and the rear panel 353 may be replaced with the supporting block 310 and may perform an action of supporting the own weight of the first main body 2a, which may be insufficient in the supporting block 310.

The bottom panel 355 and the top panel may be provided with a connection pipeline 360 communicating with the main body 2a or 2b or the interior of the vacuum space part 50 of the vacuum adiabatic body providing the main body. The connection pipeline 360 may be provided with a welded pipeline or a corrugated conductive resistance sheet 63 so as not to adversely affect the vacuum of the vacuum space part. The connection pipeline 360 may be provided with a pipeline through which defrost water, electric wires, cold air, and refrigerant pass. Anyone of the connection pipelines 360 may provide pipelines through which one or more materials pass. Here, the connection pipeline may be provided by a through-hole provided in each plate member.

The division panel 354 can divide the inner space of the mullion 300 to be capable of acting differently.

The spaces divided by the division panel 354 may have different physical actions from each other. For example, the spaces may be maintained at different temperature conditions or at different humidity conditions.

The division panel 354 not only functions to divide the inner space of the mullion but also functions to support the own weight of the first main body 2a together with the front panel 351, the side panel 352, the bottom panel 355, and the rear panel 353.

In this case, the division panel 354 can perform a function of firmly supporting the center of the lower surface part of the first main body 2a where the sag thereof may occur, so as to perform the action of crossing the inner space of the mullion 300. In other words, the strength of the vacuum adiabatic body constituting the first main body 2a can be reinforced. The division panel 354 may be fastened to the first main body 2a.

Figure 11:
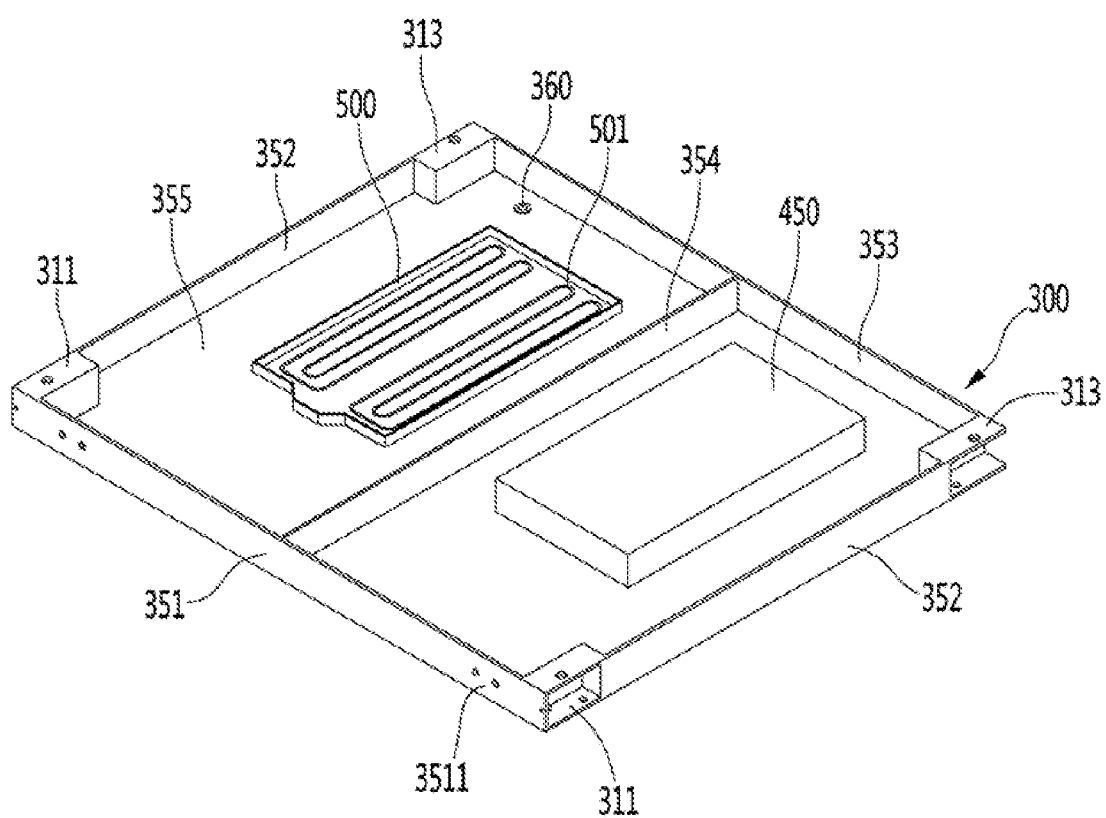
FIG. 11 is a view for explaining an internal configuration of a mullion according to an embodiment.

FIG. 11 is a view for explaining an internal configuration of a mullion according to an embodiment.

Referring to FIG. 11, the division panel 354 may divide the inner space of the mullion 300 into at least two spaces.

For example, any one of the divided spaces may provide the defrost water collecting space, and the other of the divided spaces may provide the controller accommodation space. The defrost collecting space may include a drain tray 500 which receives and stores the defrost water introduced from the evaporator that communicates with the defrost collecting space and a drain heater 501 which evaporates the defrost water collected in the drain tray 500. A controller 450 is provided in the controller accommodation space, and a plurality of electronic parts such as a control chip, a power chip, and the like necessary for controlling the refrigerator can be accommodated.

The defrost water collecting space and the controller accommodation space have different characteristics of space. For example, the defrost water collecting space may be provided as a space of high temperature and high humidity, and the controller collecting space may be provided as a space of low temperature and low humidity. This is because heat is generated in the treatment of the defrost water to generate an environment of high humidity by the evaporated vapor, and the controller is difficult to secure the reliability of the electronic part in a high temperature and high humidity environment.

The division panel 354 allows one side and the other side thereof to be separated as much as possible from each other with respect to heat or moisture so that the two spaces do not affect each other. To this end, a sealing member may further be provided at a contact portion with each panel, which is in contact with the division panel 354, so that at least two spaces divided by the division panel 354 can be sealed.

The division of the space by the division panel 354 is not limited to the above example, and various combinations of different use spaces can be created. In a case where the mullion is provided not with the adiabatic space but with a space for accommodating the parts necessary for the operation of the refrigerator, the advantage of securing the space inside the refrigerator can be expected by maximizing the space of the refrigerator.

Figure 12:
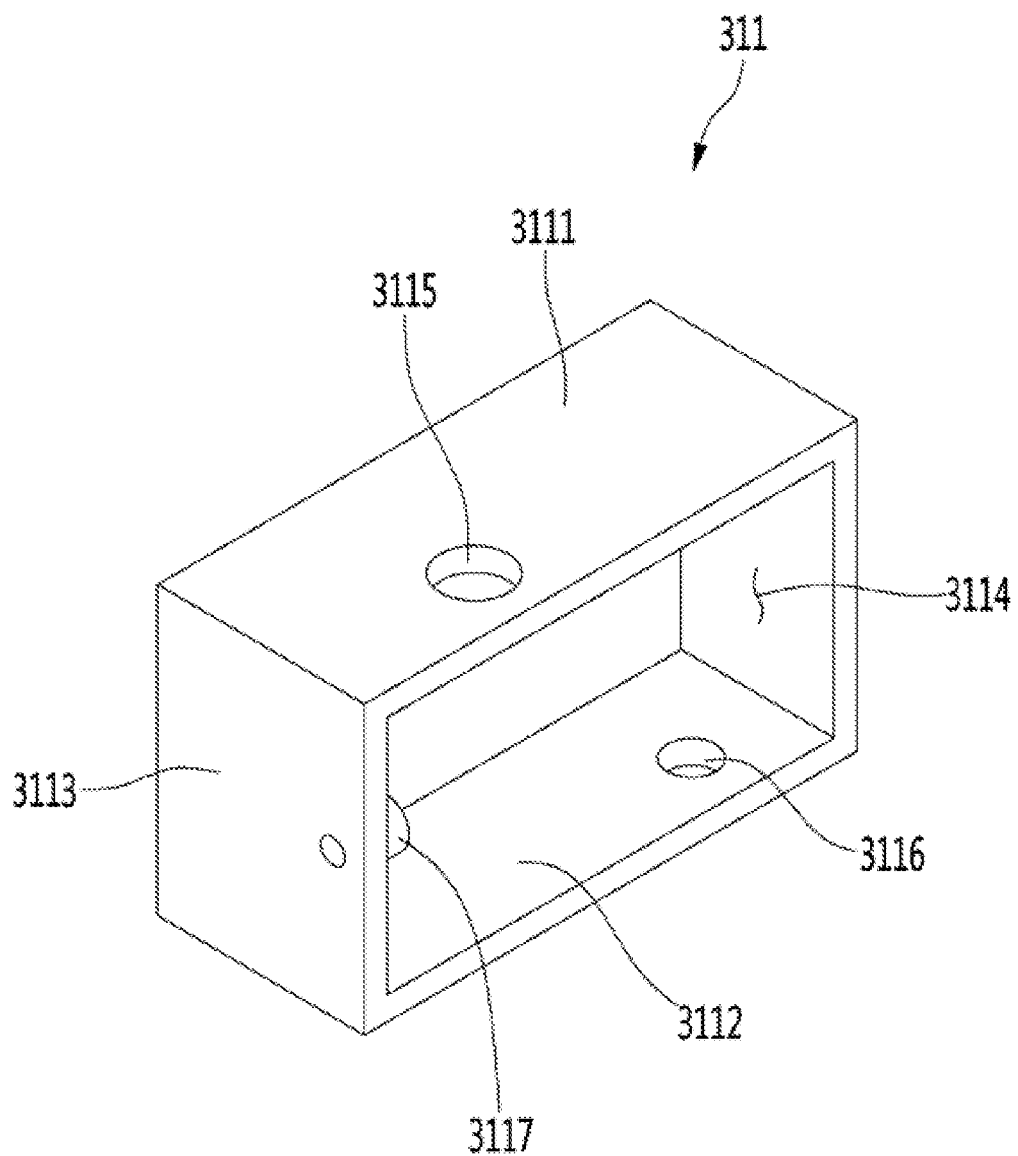
FIG. 12 is a perspective view illustrating the front supporting block.
Figure 13:
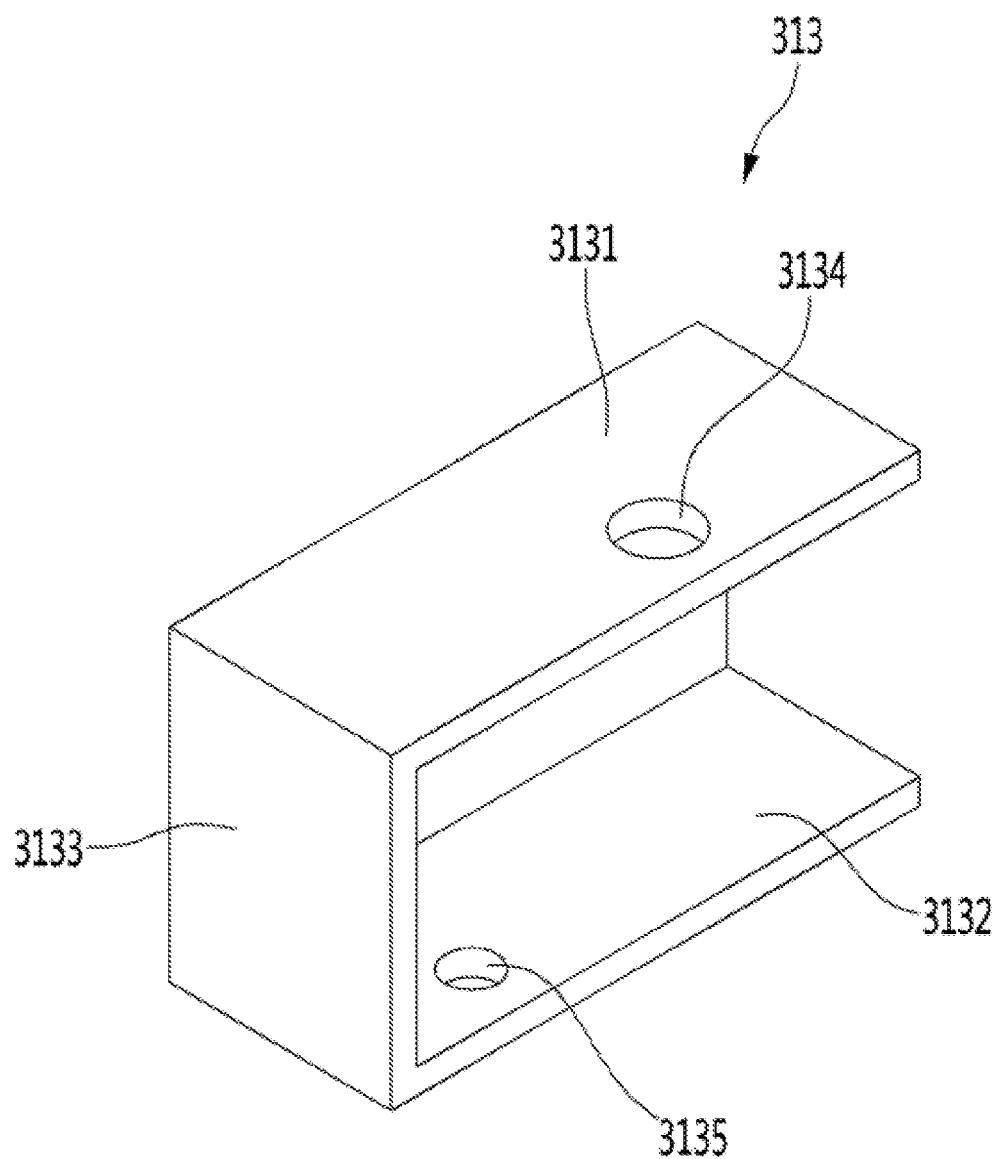
FIG. 13 is a perspective view of a rear supporting block.

FIG. 12 is a perspective view illustrating the front supporting block, and FIG. 13 is a perspective view illustrating the rear supporting block. In the drawings, the lower left of the drawing may be the front of the refrigerator.

Referring to FIG. 12, the front supporting block 311 is provided with a front upper surface part 3111 to which the lower surface of the first main body 2a is fastened and a front lower surface part 3112 which is fastened to the upper surface of the second main body 2b. The front upper surface part 3111 and the front lower surface part 3112 are fastened to the corresponding surfaces of the main body 2a and 2b so that the main body and the supporting block can be moved together.

The front upper fastening part 3115 and the front lower fastening part 3116 are provided on the front upper surface part 3111 and the front lower surface part 3112 so that the respective fastening parts can approach and reach the main bodies 2a and 2b. As an example, a boss is provided on the side of each of the main bodies 2a and 2b, and the boss is fitted in correspondence with the grooves of the front upper fastening part 3115 and the front lower fastening part 3116, and the fastening parts 3115 and 3116 can be fastened to the main body 2a and 2b by fastening the separate fastening members to the bosses, respectively.

So as to maintain the gap between the front upper surface part 3111 and the front lower surface part 3112, a front supporting part 3113 may be provided. The front supporting part 3113 may be provided as a planar structure for connecting each corner of the front upper surface part 3111 and the front lower surface part 3112. The front supporting part 313 may be provided on a surface facing the front side of the refrigerator among the front supporting blocks 311, and a boss 3117 may be provided on the surface facing the front side thereof. The boss 3117 may be applied to fastening the front panel 351. The boss 3117 can enhance the role of supporting the own weight of the door as described above.

The height of the front supporting part 3113 is the same as that of the front panel 351 so that the setting of the fastening surface can be accurately maintained.

One surface to which the front supporting part 3113 is not provided may provide a forward opening surface 3114. A worker can access from outside through the front opening surface 3114. For example, the front upper fastening part 3115 and the front lower fastening part 3116 may be fastened using a structure such as a bolt which reaches and is entered the front upper fastening part 3115 and the front lower fastening part 3116. The same or similar fastening operation may be performed with respect to the boss 3117 of the front supporting part 3113.

The front opening surface 3114 is preferably a side surface facing the outer surface of the refrigerator (right side facing surface with reference to the drawing) as illustrated in the drawing. This is because the worker can perform necessary tasks such as fastening and dismounting more conveniently through the outer surface of the refrigerator.

The front supporting part 3113 is further provided to the rear and left sides with reference to the drawing. The front supporting parts provided on the left and rear sides may not be provided. However, it is true that it is desirable to provide so as to secure the sufficient strength of the front supporting block 311. In some cases, it is obvious that, in a case where sufficient strength can be ensured, the front supporting parts provided on the left and rear sides may not be provided.

Referring to FIG. 13, the rear supporting block 313 may perform a similar operation in a configuration similar to that of the front supporting block 311. Therefore, the description of the front supporting block 311 can be applied to a part thereof which is not specifically explained.

Specifically, a rear upper surface part 3131 fastened to the lower surface of the first main body 2a and a rear lower surface part 3132 fastened to the upper surface of the second main body 2b are provided. The front upper surface part 3111 and the front bottom surface part 3112 may be provided with a front upper fastening part 3115 and a front lower fastening part 3116, respectively.

A rear supporting part 3133 may be provided so as to maintain a gap between the rear upper surface part 3131 and the rear bottom surface part 3132. Unlike the front supporting part 3113, the rear supporting part 3133 can be provided in the front and left sides and the other portion can be opened. According to such a configuration, the worker can conveniently perform the fastening operation since the worker can select any one surface among the right side surface and the rear surface, that is, two surfaces, of the rear supporting block 313, which are exposed as the outer surface of the refrigerator. The rear supporting block 313 does not directly fasten to the door even in an aspect of supporting the own weight of the first main body 2a so that it is possible to support the own weight even by the two rear supporting parts 3133.

FIGS. 14 to 18 are views illustrating another embodiment of the mullion. In the portions not specifically provided among the following description, those already described will be applied.

Figure 14:
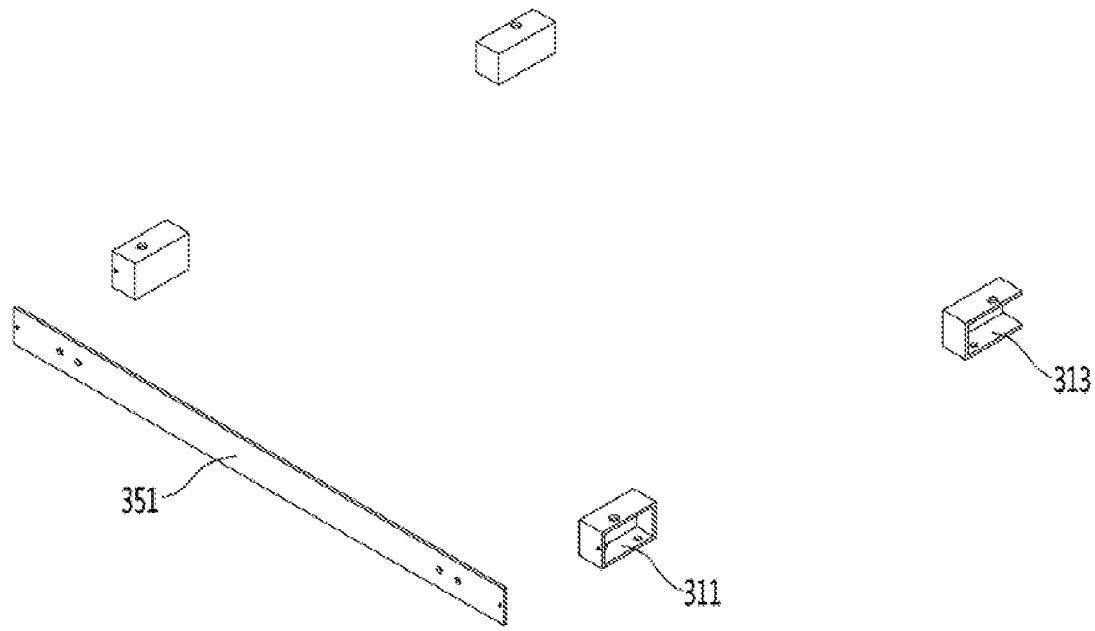
FIGS. 14 to 18 are views illustrating another embodiment of a mullion.

Referring to FIG. 14, the present embodiment provides the front supporting block 311 and the rear supporting block 313 to provide a gap between the main bodies 2a and 2b. The present embodiment provides a gap which provides a refrigerator having two spaces divided by the supporting blocks 311 and 313.

A front panel 351 is provided in front of the pair of front supporting blocks 311. A relatively thick plate-like member may be applied to the front panel 351 to fasten the door or the like. In addition to the front panel 351, left, right, and rear sides of the mullion 300 do not apply a separate panel that shields the inside of the mullion or reinforces the strength of the mullion. However, it is not excluded that a decoration plate made of a resin material is installed so as to cover not only the main bodies 2a and 2b but also the mullion portion after the manufacture of the refrigerator is completed. This description can be applied equally in the following embodiments with respect to all the surfaces on which no panel member is provided.

In this embodiment, the panel member is not provided in the other portion except that the front panel is installed for fastening the door. According to the present embodiment, the cost can be minimized.

As is clear from this embodiment, the bottom panel 355 and the top panel may be omitted by the second plate member 20 being applied. The bottom panel 355 and the top panel may not be provided separately in a case where the second plate member 20 has a predetermined thickness and a supporting strength with respect to the supporting block 310.

Figure 15:
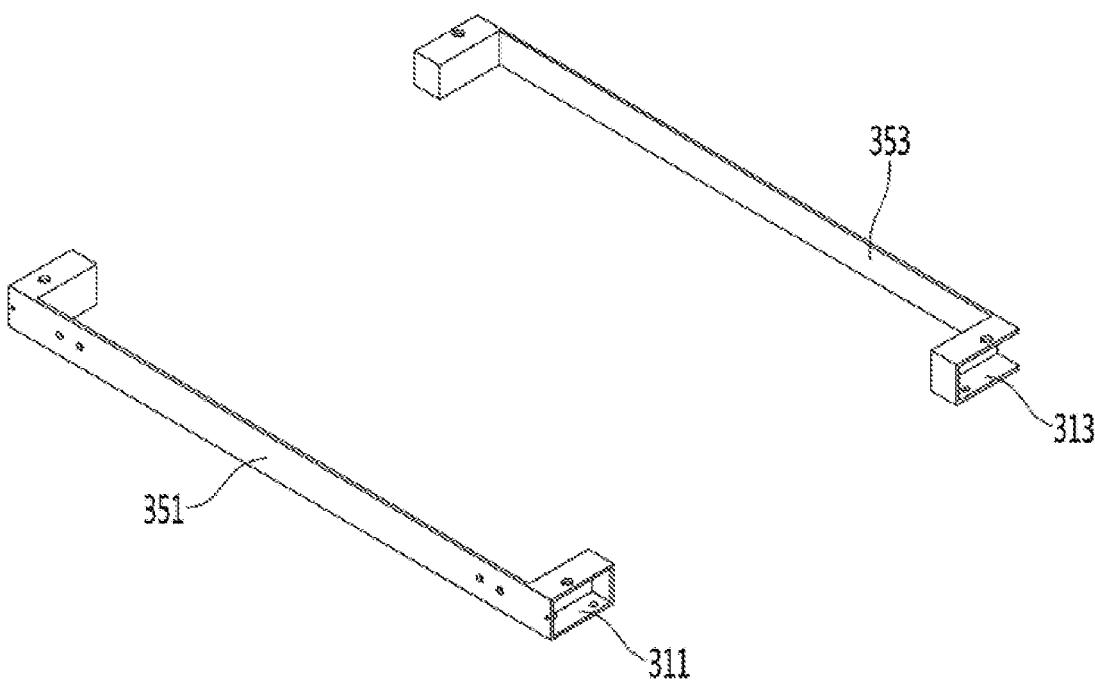

Referring to FIG. 15, the embodiment illustrated in FIG. 15 differs from the embodiment illustrated in FIG. 14 in that the rear panel 353 is further installed. The present embodiment makes it possible to protect the rear surface part of the mullion for the purpose of reinforcing the strength between the main bodies 2a and 2b and for the separate purpose such as the characteristic protection of the rear surface part or the rear portion of the mullion.

The present embodiment has the effect of reinforcing the strength of the mullion 300 and achieving shielding of the rear surface part, although the cost for installing the rear panel may be additionally required.

Figure 16:
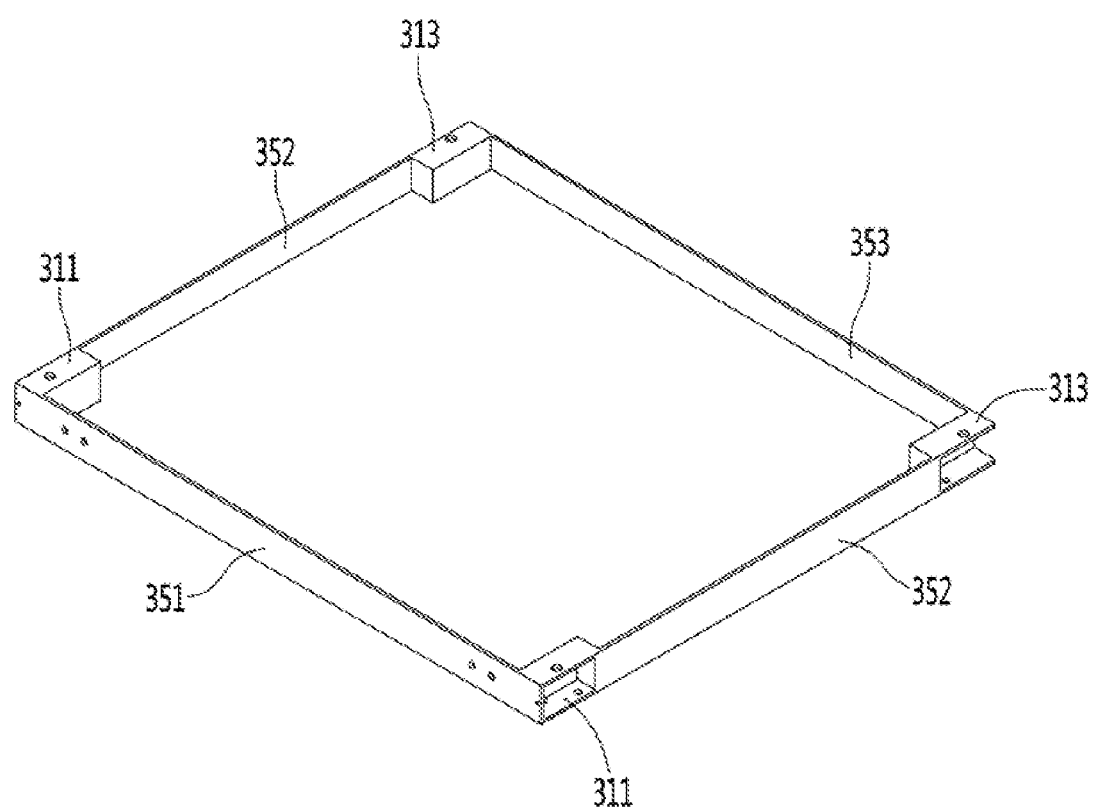

Referring to FIG. 16, the embodiment illustrated in FIG. 16 characteristically differs from the embodiment illustrated in FIG. 15 in that the side panel 352 is further installed. The present embodiment makes it possible to protect the side surface part of the mullion for the purpose of reinforcing the strength between the main bodies 2a and 2b or for the separate purpose such as the characteristic protection of the side surface part or the mullion side surface part.

Although the cost for installation of the side panels may be additionally required in the present embodiment, it is effective to reinforce the strength of the mullions 300 and to achieve shielding of the side surface part.

Figure 17:
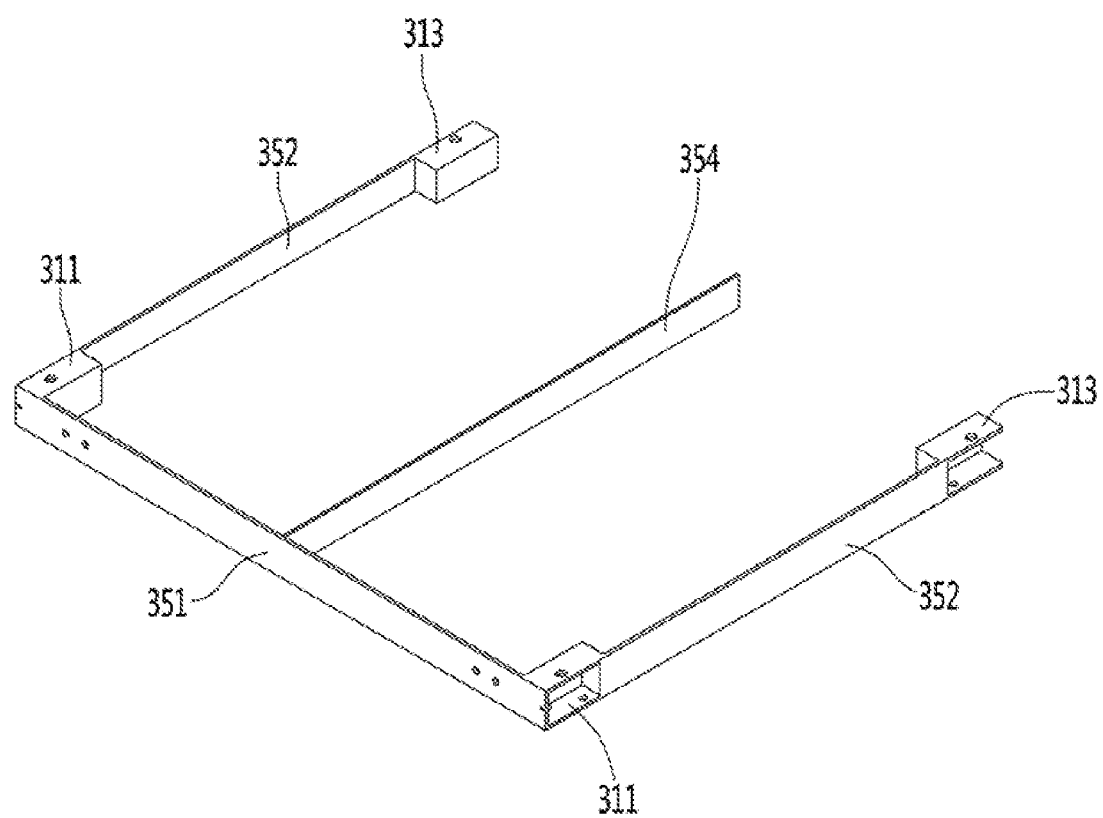

Referring to FIG. 17, the front panel 351 and the side panel 352 are provided to open without providing the rear panel 353 among the outer panels of the mullion. The worker can carry out operations such as repairing of trouble and taking out parts through the surface on which the rear panel 353 is not provided.

In a case of this embodiment, a division panel 354 may be further provided to divide and accommodate parts inside the mullion 300 from each other. The inner space of the mullion can be divided by the division panel 354 to be different physical characteristics.

In this embodiment, the panel, particularly the division panel 354, can support the own weight of the first main body 2b, particularly the own weight of the middle portion thereof. Accordingly, it is possible to prevent the sag and deformation of the bottom surface of the first main body 2b.

Figure 18:
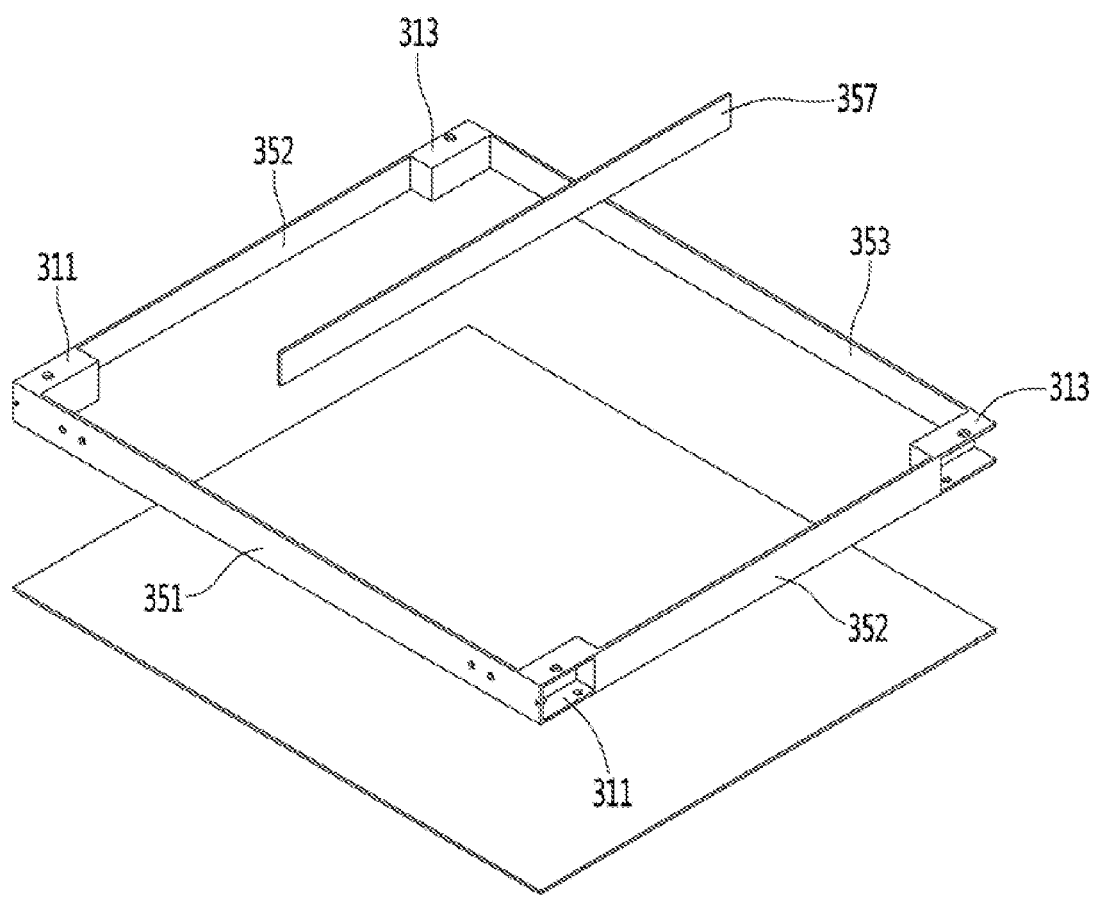

FIG. 18 differs from the embodiment illustrated in FIG. 11 in that at least one of the division panel 354 and the bottom panel 355 is provided in a separate form which is separated from other panels.

In this embodiment, the bottom panel 355 can be applied to the upper outer surface of the second main body 2b as a product separated from other panel members and the supporting block. In this case, the bottom panel 355 is a product made of a resin material securing an adiabatic function, and the influence on the outer surface of the second main body 2b, particularly the second plate member 20 by the inner temperature of the mullion can be reduced. The description of the bottom panel 355 may be similarly applied to the top panel, though not illustrated.

As described above, although the mullion is provided as an essential function to perform an adiabatic function, it cannot reach the vacuum inside the third space. Therefore, even if a separate part is inserted into the inside of the third space, the temperature inside the main body may not be affected by the adiabatic effect of the third space.

In another embodiment, a separable division wall 357 corresponding to the division panel 354 may be provided at a position corresponding to the division panel 354. The separable division wall 357 may be made of resin, for example, different from other panels forming the mullion. In this case, it is possible to weaken the role of supporting the lower surface of the first main body 2a, but it is also possible to fit the separable division wall 357 so as to enhance the reliability with respect to the mutual separation of the divided inner spaces of the mullion.

In this embodiment, a manufacturing process in which the supporting block 310, the front panel 351, the rear panel 353, and the side panel 352 are integrally provided can be introduced. The separable division wall 357 and the bottom panel 355 may be added when needed later or when the model of the product is changed. In this case, the same parts can be applied to the product in a state where the separable division wall 357 and the bottom panel 355 are not present, thereby reducing inventory costs.

FIGS. 19 to 24 illustrate an embodiment of a refrigerator using a separate vacuum adiabatic body. In the following description, a side view of the refrigerator is illustrated and explained, and a vacuum adiabatic body is used as the main body unless otherwise specified. In a case where the leader line passes through the vacuum adiabatic body, it can be understood that the pipeline and the part line pass through the vacuum adiabatic body. When penetrating the vacuum adiabatic body, members such as a welding pipeline and a corrugated conductive resistance sheet 63 can be applied. The welding pipeline and the corrugated conductive resistance sheet 63 can be subjected to a sealing action. In a case where the leader line passes through the inside of the vacuum adiabatic body, it can be understood that the pipeline or part line passes inside the vacuum adiabatic body.

Figure 19:
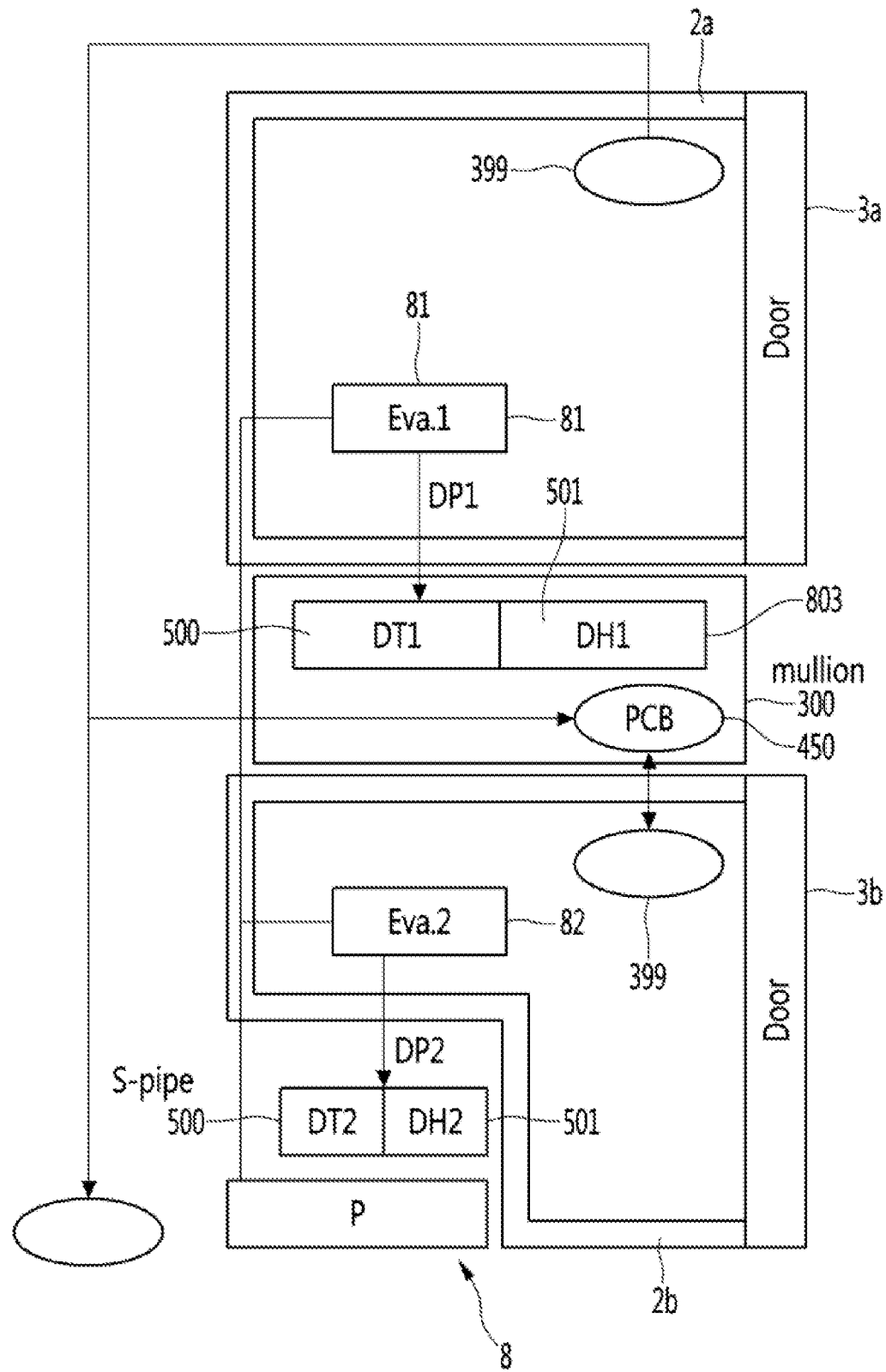
FIGS. 19 to 24 are views schematically illustrating embodiments of a refrigerator using a separating vacuum adiabatic body.

Referring to FIG. 19, as described above, the present embodiment is a case where a drain tray (also abbreviated as DT) 500, a drain heater (also abbreviated as DH) 501, and a controller 450 is placed in the mullion 300.

For the convenience of explanation, the supply path of the power supply, the supply path of the refrigerant and the cold air, and the discharge path of the defrost water are separately described.

First, the power supply path will be described. An external power source supplied from the second space is supplied to the controller 450 inside the mullion 300 placed in the second space. The controller 450 supplies the necessary power to the various parts 399 necessary for the operation of the refrigerator. The part 399 may include a lamp and a sensor and is placed in the first space. In a case where the part 399 is a sensor, the controller 450 not only supplies power to the sensor but also receives the sensing signal of the sensor. It will be appreciated that the part 399 also includes a compressor P constituting a refrigeration cycle.

The power may pass through the third space so as to supply power to the first space from the second space or may pass through a gap part between the door and the main body.

The supply path of the coolant and cold air will be described.

First, cold air is explained. The cold air can be provided by the evaporators 81 and 82 placed in the inside of the main bodies 2a and 2b, that is, in the first space, respectively, and be supplied to the inside of each of the main bodies 2a and 2b.

The refrigerant supply to the evaporators 81 and 82 will be described. The refrigerant can be provided to each evaporator which is placed in the first space in a state before the evaporation, by the member including the compressor P placed in the machine chamber 8 provided in the second space. It is preferable for the pipelines of the inlet and outlet of the evaporators 81 and 82 to perform heat exchange to each other for improving the efficiency of the refrigeration cycle. Therefore, the refrigerant pipeline may have a flow path placed in the first space and a flow path placed in the second space, respectively.

Figure 24:
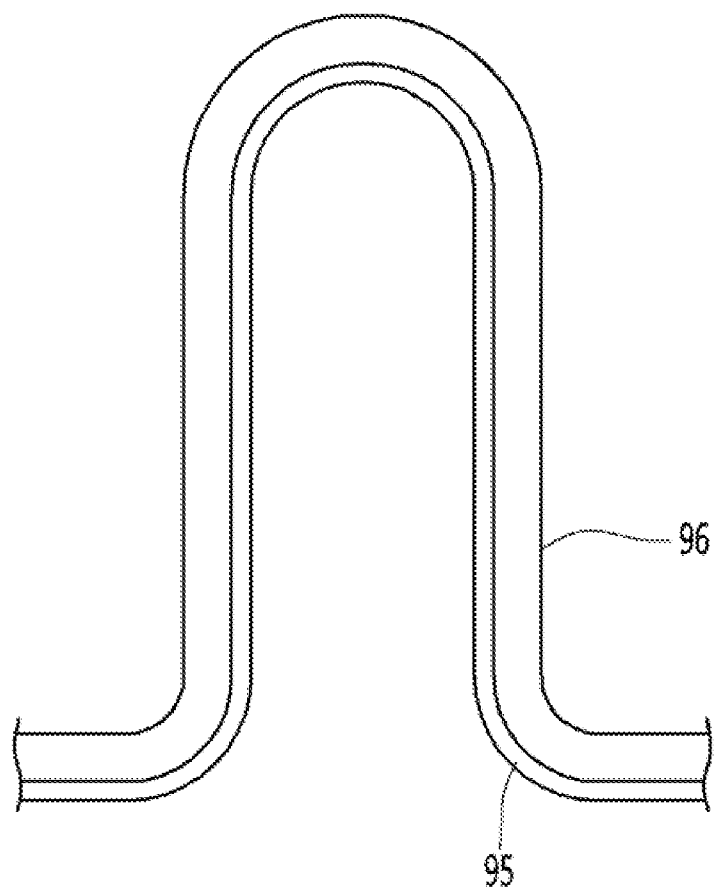

Referring to FIG. 24, it can be seen that the two pipelines of the first refrigerant pipe 95 and the second refrigerant pipe 96 approach each other and heat exchange occurs with each other. The first refrigerant pipe 95 may extend from the expander inside the machine chamber 8 and the second refrigerant pipe 96 may be a pipeline extending from the evaporators 81 and 82. The heat exchange pipelines formed by the contact of the two refrigerant pipes are provided in a curved shape so as to secure a sufficient heat exchange length in a narrow space, so the heat exchange pipelines can be called heat exchange curved pipes or S-pipes.

Referring again to FIG. 19, the S-pipe may be placed in the third space which is an inner part of the wall body of each main body, that is, the vacuum adiabatic body. Therefore, it is possible to prevent heat loss, and there is no need for a space for insulating the pipeline separately.

This is explained using time series. The refrigerant compressed/condensed/expanded in the machine chamber and directed to the evaporator 81 or 82 is bent by the heat exchange curved pipe inside the vacuum adiabatic body and supplied to the second evaporator (EVA. 2) 82. The refrigerant can be bent in the vacuum adiabatic body constituting the first main body 2a by the heat change curved pipe and be supplied to the first evaporator (Eva. 1) 81. The refrigerant supplied to each of the evaporators 81 and 82 can be branched and supplied, and the branched point can be placed inside the machine chamber 8, that is, inside the vacuum insulation body.

The refrigerant evaporated in the evaporators 81 and 82 can perform heat exchange through the respective curved pipes.

The discharging path of the defrost water will be described.

The defrost water generated in the first evaporator 81 placed in the first space is collected in the drain tray (DT1) 500 positioned in the mullion 300 which is placed in the second space through the third space, can be appropriately vaporized and removed by the drain heater (DH1) 501. The defrost water generated in the second evaporator 82 placed in the first space can be collected in the drain tray (DT2) 500 positioned in the interior of the machine chamber 8 placed in the second space through the third space, and be appropriately vaporized and removed by the drain heater (DH2) 501.

Here, a drain pipe (also referred to as DP) for connecting the evaporators 81 and 82 and the drain tray (DT1, DT2) 500 may be used to penetrate the third space. The defrost water can pass through the drain pipe. The drain pipe (DP1) (DP2) may pass through the welding pipeline and corrugated conductive resistance sheet 63. The drain pipe is illustrated as passing through the bottom surface of the vacuum adiabatic body in the drawing, but may also be drawn out through the rear and side surfaces.

Although it is illustrated that the drain pipe passes through the welding pipeline and corrugated conductive resistance sheet, the present invention is not limited thereto, and the drain pipe may be implemented by other methods, such as through pipes, drain pipe welding, and cylindrical sheets. The same is applied hereinafter.

Figure 20:
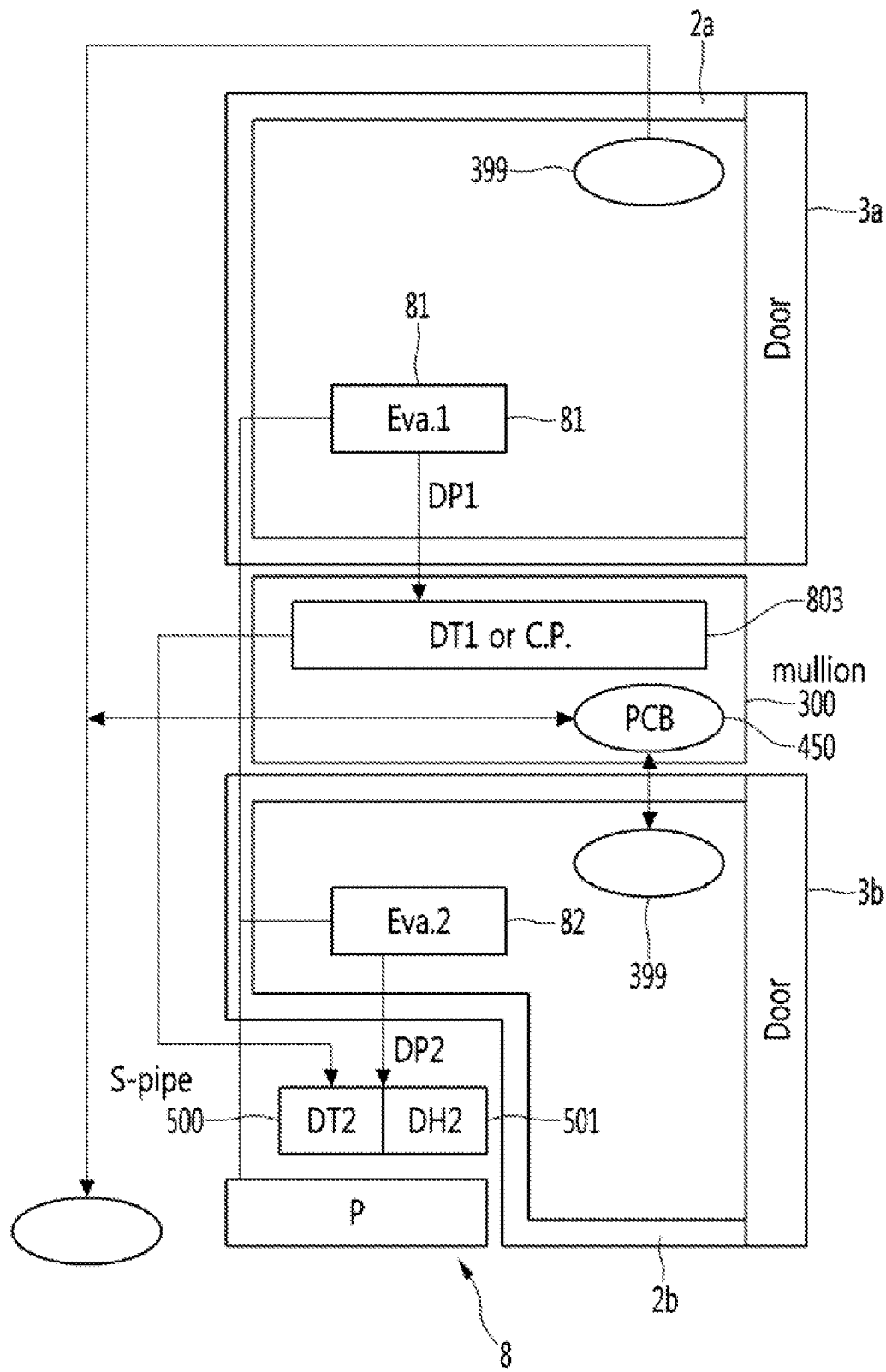

Referring to FIG. 20, this embodiment characteristically differs from the embodiment illustrated in FIG. 19 only in the discharge path of the defrost water. Therefore, the description of FIG. 19 is applied to other description as it is, and only the discharging path of the defrost water will be described.

The defrost water generated in the first evaporator 81 may be guided to the defrost water connection part 510 positioned inside the mullion 300. The defrost water connection part 510 is a portion where the defrost water generated in the first main body 81 is guided primarily to the outside of the first main body 2a. The defrost water connection part 510 may be provided as a drain tray (DT1) or a connection pipe (CP).

The defrost water generated in the second evaporator 82 is collected in the drain tray DT2 500 positioned inside the machine chamber 8 and can be appropriately vaporized and removed by the drain heater (DH2) 501.

The defrost water of the defrost water connection part 510 may be collected in the drain tray (DT2) 500 positioned inside the machine chamber 8 and appropriately vaporized and removed by the drain heater (DH2) 501. At this time, the pipeline connecting the defrost water connection part 510 and the drain tray (DT2) to each other may be guided to the outside without passing through the wall body of the vacuum adiabatic body. In this case, the effect of preventing deterioration of the adiabatic performance of the vacuum adiabatic body can be obtained.

The defrost water can pass through a drain pipe (also referred to as DP) connecting the evaporators 81 and 82 and the defrost water connection part 510 or the drain tray (DT2) 500. The drain pipes (DP1 and DP2) may pass through the welding pipeline and the corrugated conductive resistance sheet 63.

According to the present embodiment, a larger action effect can be expected in a case where the space inside the mullion 300 is narrow.

Figure 21:
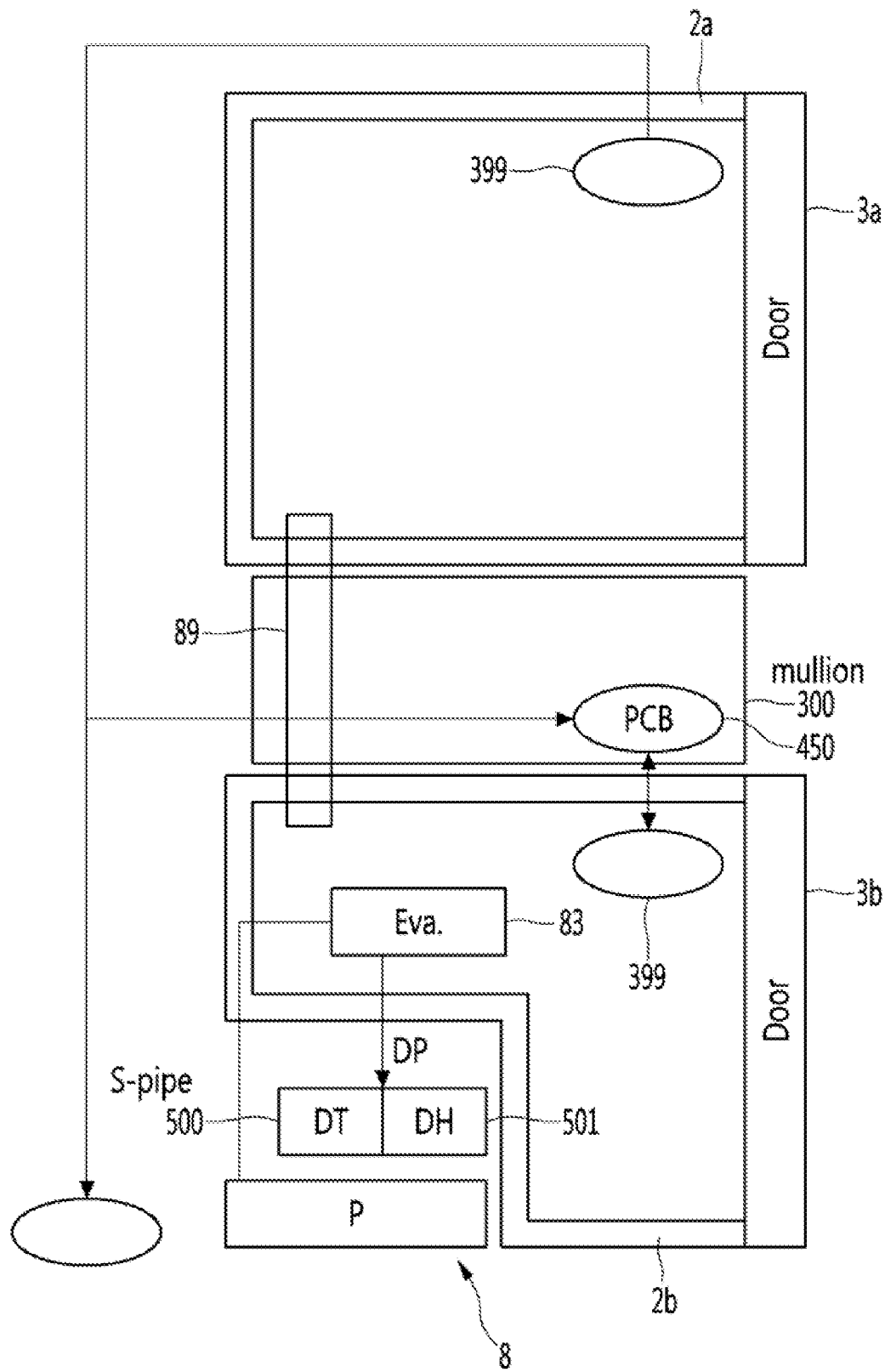

Referring to FIG. 21, the present embodiment characteristically differs from the embodiment of FIG. 19 in that one evaporator is installed in the second main body 2b.

This will be described in detail below.

In this embodiment, although the controller 450 is placed inside the mullion 300, a drain tray (abbreviated as DT) 500 and a drain heater (also abbreviated as DH) 501 is not placed inside the mullion 300.

In this embodiment, the supply path of the power supply is the same as that illustrated in FIG. 19.

In the present embodiment, the evaporator is provided with a single evaporator 83 which is provided as a single unit without being provided for each of the bodies 2a and 2b. Accordingly, the refrigerant can be supplied to the single evaporator 83 in a state before evaporation by the member including the compressor P placed in the machine chamber 8. So as to improve the efficiency of the refrigeration cycle, it is preferable for pipelines of the inlet and outlet of the single evaporator 83 to perform heat exchange with each other. Therefore, the heat exchange curved pipes are provided inside the wall body of the vacuum insulation body so that heat exchange can be performed with each other.

The cold air is explained. Cool air is provided by a single evaporator 83 placed inside the second main body 2b, and the cold air can be supplied to the inside of the second main body 2b. The cold air in the second main body 2b may be supplied to the inside of the first main body 2a through the cold air flow path 89 provided in the mullion 300. A fan for blowing cold air from the second main body 2b to the first main body 2a may be provided in the cold air flow path 89. The cold air flow path 89 can include a flow path which guides relatively cool-cold air from the second main body 2b to the first main body 2a and a flow path which guides relatively hot-cold air from the first main body 2a to the second main body 2b.

The discharging path of the defrost water will be described.

The defrost water generated in the single evaporator 83 is collected in the drain tray (DT2) 500 positioned inside the machine chamber 8 and can be appropriately vaporized and removed by the drain heater (DH2) 502. Here, the defrost water can pass through a drain pipe (also referred to as DP) connecting the single evaporator 83 and the drain trays (DT1) (DT2) 500 to each other. The drain pipes (DP1) (DP2) may pass through the welding pipeline and the corrugated conductive resistance sheet 63.

This embodiment is more preferably applied in a case of a refrigerator in which the inner space of the first main body is narrow, the inner space of the mullion is narrow, the size of the refrigerator is small, the large cooling capacity is not required, or the lower-freezing refrigerator.

Figure 22:
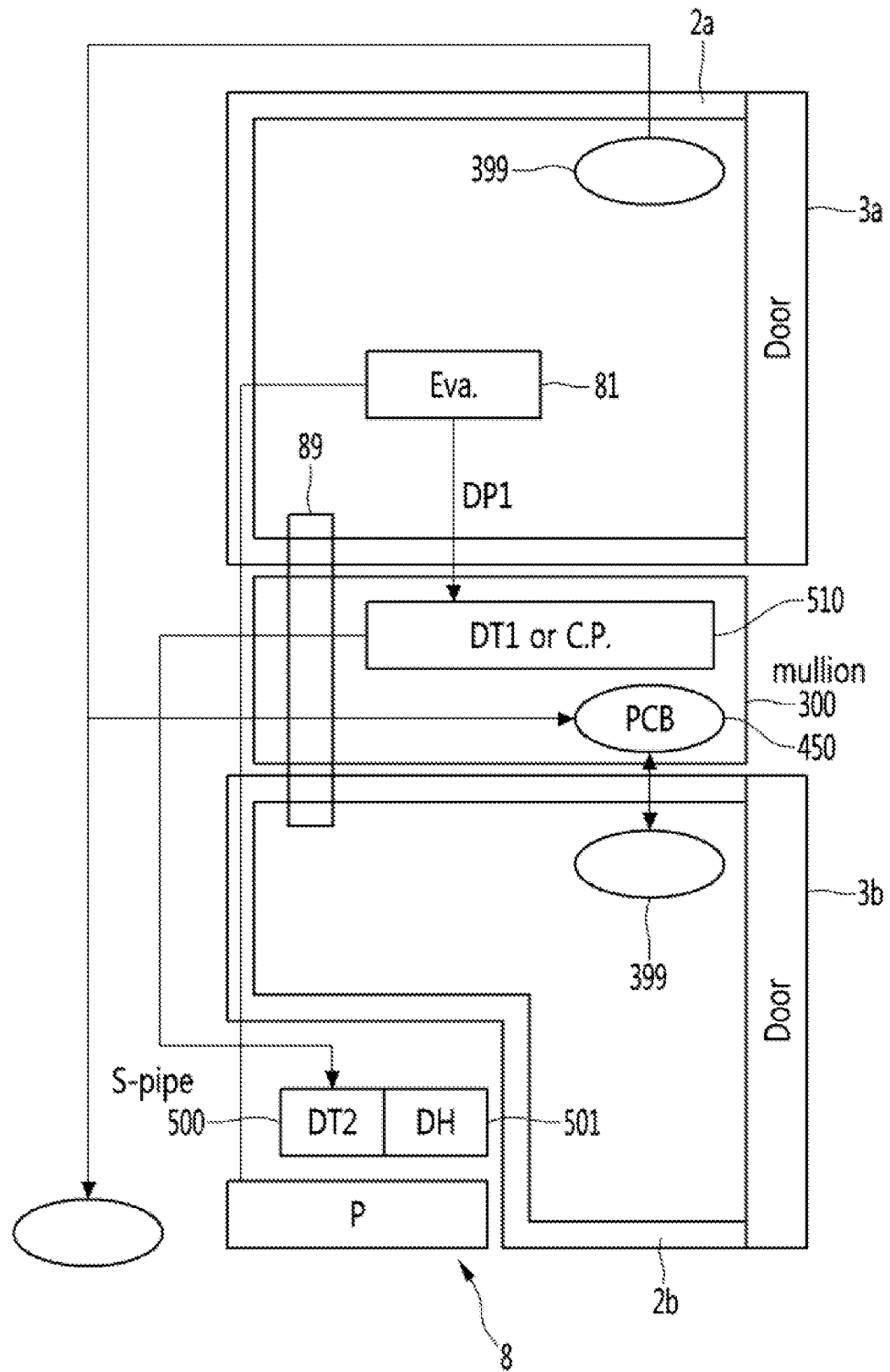

Referring to FIG. 22, the present embodiment characteristically differs from the embodiment illustrated in FIG. 21 in that the single evaporator 83 is installed inside the first main body 2a. The defrost water discharge path is similar to the embodiment illustrated in FIG. 20.

This will be described in detail below.

In the present embodiment, the controller 450 and the defrost water connection part 510 are placed inside the mullion 300.

In this embodiment, the supply path of the power supply in this embodiment is the same as that illustrated in FIG. 19.

In the present embodiment, the evaporator is provided with a single evaporator 83 which is provided as a single unit without being provided for each of the main bodies 2a and 2b. Therefore, the refrigerant can be provided to the single evaporator 83 in a state before evaporation by the member including the compressor P placed in the machine chamber 8. So as to improve the efficiency of the refrigeration cycle, it is preferable that heat transfer between the pipelines of the inlet and outlet of the single evaporator 83 is performed. Therefore, the heat exchange curved pipes are provided inside the wall body of the vacuum adiabatic body so that heat exchange can be performed with each other. However, the single evaporator 83 is placed in the first main body 2a instead of the second main body 2b.

The cold air will be described. Cold air is provided by a single evaporator 83 placed inside the first main body 2a, and the cold air can be supplied to the inside of the first main body 2a. The cold air inside the first main body 2a can be supplied to the inside of the second main body 2b through the cold air flow path 89 provided to the mullion 300. A fan for blowing cold air from the first main body 2a to the second main body 2b may be provided in the cold air flow path 89. The cold air flow path 89 can include a flow path for guiding relatively cool-cold air from the first main body 2a to the second main body 2b and a flow path for guiding relatively hot-cold air from the second main body 2b to the first main body 2a.

The discharging path of the defrost water will be described.

The defrost water generated in the single evaporator 83 may be guided to the defrost water connection part 510 positioned inside the mullion 300. The defrost water connection part 510 is a portion where defrost water generated in the single evaporator 83 is guided primarily to the outside of the first main body 81. The defrost water connection part 510 may be provided as a drain tray (DT1) or a connection pipe (CP).

The defrost water of the defrost water connection part 510 is collected in the drain tray (DT2) 500 positioned inside the machine chamber 8 and can be appropriately vaporized and removed by the drain heater (DH) 501. At this time, the pipeline connecting between the defrost water connection part 510 and the drain tray (DT2) to each other may be guided to the outside without passing through the wall body of the vacuum insulation body. In this case, the effect of preventing deterioration of the adiabatic performance of the vacuum adiabatic body can be obtained.

The defrost water can pass through a drain pipe (also referred to as DP) connecting the single evaporator 83 and the defrost water connection part 510. The drain pipe (DP1) may pass through the welding pipeline and the corrugated conductive resistance sheet 63.

The present embodiment may be more preferably applied in a case of a refrigerator in which the inner space of the second main body is narrow, the size of the refrigerator is small, a large cooling capacity is not required, or the upper-refrigerating refrigerator.

Figure 23:
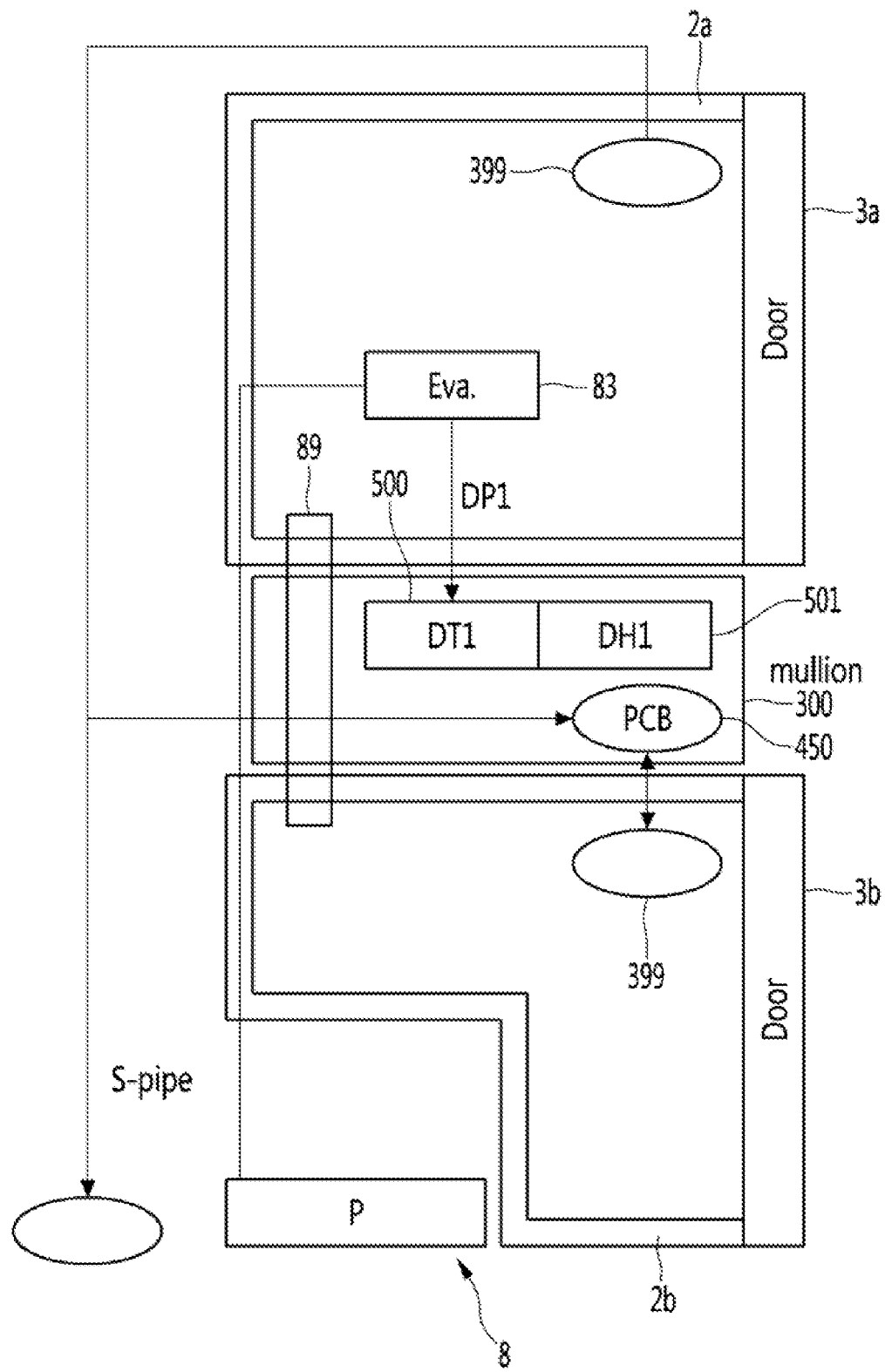

Referring to FIG. 23, this embodiment differs from the embodiment illustrated in FIG. 22 in that a structure for collecting and vaporizing the defrost water is provided to the mullion.

This will be described in detail below.

The supply path of the power supply, the supply path of the refrigerant, and the supply path of the cold air are the same as those of the embodiment of FIG. 22, and the discharge path of the defrost water is characteristically different from the embodiment of FIG. 22.

The defrost water generated in the single evaporator 83 is collected in the drain tray (DT1) 500 positioned inside the mullion 300 and can be appropriately evaporated and removed by the drain heater (DH1) 501.

In this embodiment, in a case where the inner space of the second main body is narrow, the size of the refrigerator is small, the large cooling capacity is not required, or the upper-refrigerating refrigerator, in a case where the space of the machine chamber 8 is narrow, and a predetermined level or more of space can be secured in the mullion 300, it can be more preferably applied.

INDUSTRIAL APPLICABILITY

The present invention proposes a method for supporting a gap part in the refrigerator which is physically separated from each other in a case where a separate vacuum adiabatic body is used and a method for effectively utilizing the mullion using a feature in which an adiabatic action is not required in the gap part therebetween.

According to the present invention, there is proposed a method for actively controlling the environment in a refrigerator as needed using a vacuum adiabatic body in a refrigerator in which refrigerating and freezing are required together.

This suggests that the vacuum adiabatic body can be used more industrially.

Technical Problem

The present invention is proposed in the background described above and proposes a method of fastening each vacuum adiabatic body in a case where a plurality of storage chambers having different temperatures are provided as a vacuum adiabatic body.

The present invention proposes a refrigerator in which the disposition of parts including a vacuum adiabatic body providing a plurality of storage chambers is efficiently performed.

The present invention proposes a refrigerator in which a pipeline connection of a vacuum adiabatic body providing a plurality of storage chambers is effectively performed.

Technical Solution

The vacuum adiabatic body according to the present invention includes a supporting block which is fastened to an outer surface of any one plate placed outside the plate member constituting an outer wall of the vacuum adiabatic body. Accordingly, it is possible to provide a refrigeration apparatus in which a plurality of products in which temperatures different from each other can be maintained, in particular, a refrigerating chamber and a freezing chamber are provided together, since a gap can be maintained between the vacuum adiabatic body and an external product, particularly, another vacuum adiabatic body.

The supporting block may be provided at a vertex of a flat surface of any one plate. Accordingly, the support of the entire plate can be stably performed.

A division panel which is fastened across the flat surface of any one plate may be included, and accordingly, a space formed by any one plate may be utilized for another purpose to be different from each other.

A refrigerator according to the present invention includes: a first main body which is provided as a first vacuum insulation body having a first opening with respect to a first accommodation space of the product; a first door which opens and closes the opening of the first main body; a second main body which is provided as a second vacuum insulation body having a second opening with respect to a second accommodation space of another product; a second door which opens and closes an opening of the second main body; and a mullion which is provided at a gap part between the first main body and the second main body. According to the present invention, a plurality of vacuum adiabatic bodies can be utilized for different purposes, and the influence of each vacuum adiabatic body on each other can be eliminated.

The mullion includes a supporting block which is fastened to the corresponding outer surfaces of the first vacuum adiabatic body and the second vacuum adiabatic body; and a front panel which is provided on a front part of the mullion. Accordingly, it is possible to stably support the contact surface of the vacuum adiabatic bodies and to prevent the inflow of the external product into the gap part of the mullion.

The front panel is provided with a hinge fastening part to which the door hinge for supporting the rotation operation of the door is fastened. Accordingly, the sealing function of the vacuum adiabatic body is ensured and a stable operation can be obtained. For example, a sufficient strength can be secured as compared with a case where the door is supported on the thin wall of the vacuum adiabatic body.

The supporting block may be provided at a vertex of any one of the opposed surfaces of the first vacuum adiabatic body and the second vacuum adiabatic body. Accordingly, the contact and the gap securement between the two vacuum adiabatic bodies can be stably performed.

The supporting block and the front panel are fastened to each other by a single member. The workability of the production site is improved.

A division panel which divides the inner space into at least two spaces across the inner space of the mullion is further included. Accordingly, the inner space utilization of the mullion can be further improved.

A defrost water tray or a defrost water connection part is provided at any one place in the divided inner spaces. Accordingly, it is not necessary to utilize a separate external space and defrost water-related structure necessary for the operation can be provided so that the space inside the refrigerator can be utilized to be larger and the product can be downsized.

A controller is placed in any one place in the divided inner spaces. Accordingly, the space utilization is further increased, so that the controller, which is generally fastened to the outer surface, can be turned into the refrigerator. Nevertheless, the controller can stay in the space outside the refrigerator, so there is no problem in the operational performance of the controller.

The mullion may be provided with a cold air flow path which communicates the first main body and the second main body with each other. Accordingly, a plurality of cooling spaces can be more easily provided using a single refrigeration cycle.

A machine chamber which is positioned outside the vacuum adiabatic body; a first refrigerant pipe which extends from the machine chamber and extends along a vacuum space part within the wall body of at least one of the first vacuum adiabatic body and the second vacuum adiabatic body; an evaporator which is provided in at least one of the first main body and the second main body; and a second refrigerant pipe which extends from the evaporator and performs heat exchange inside the first refrigerant pipe and the vacuum space part can be further included. Accordingly, a single refrigeration system can realize a refrigerator capable of stable operation.

So as to provide a heat exchange pipeline of a refrigerator having a main body provided as a vacuum insulation body, a first flow path which passes the space inside the refrigerator, a second flow path which passes the space outside the refrigerator; and a third flow path which is placed in a vacuum space part which is an inner space of the vacuum insulation body so that the discharge flow path from the evaporator and the discharge flow path from the machine chamber perform heat exchange with each other can be provided. Accordingly, the vacuum space part can be efficiently used, the large space inside the refrigerator can be secured, and the product can be compactly provided.

An evaporator which is placed in the space inside the refrigerator so as to draw out the defrost water generated in the refrigerator having the main body provided as a vacuum insulation body; and a drain pipe which is installed through the vacuum space part, which is an inner space of the vacuum insulation body, so as to draw the defrost water generated from the evaporator into the space outside the refrigerator are included. According to the present invention, it is possible to improve the usability of the vacuum space part and to stably draw out the defrost water.

A drain tray which is provided inside the mullion so that the defrosted water drawn from the drain pipe can be collected. Accordingly, since the defrost water can be removed from a narrow gap part, the product can be made compact.

The refrigerator of the present invention is provided as a combination of two or more vacuum adiabatic bodies and includes mullions provided in a gap part between the vacuum insulating bodies to integrate the two or more vacuum adiabatic bodies. Accordingly, it is possible to provide a refrigerator in which the storage houses having high adiabatic efficiency are placed in mutually independent spaces to meet various consumer needs.

The controller can be placed in the mullion. Accordingly, it is possible to contribute to the compactness of the product by increasing the space utilization of the mullion which is placed outside the refrigerator.

The defrost tray may be placed in the mullion. Accordingly, space utilization can be further increased.

Advantageous Effects

According to the present invention, vacuum adiabatic bodies stacked vertically can be tightly fastened, and a worker can conveniently carry out the work.

According to the present invention, by utilizing the vacuum space part of the vacuum adiabatic body and the non-adiabatic property of the mullion, a large number of parts can be accommodated in the space, and accordingly, the volume inside the refrigerator can be made larger.

According to the present invention, it is possible to optimally dispose the connection of the refrigeration of the vacuum adiabatic body/cold air/power supply/defrost water according to the specifications of various refrigerators, thereby realizing a refrigeration cycle with the maximum efficiency.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vacuum adiabatic body comprising:
   first and second bodies, each of the first and second bodies including a first plate, a second plate and a vacuum space provided between the first plate and the second plate;
   a mullion provided between the first and second bodies;
   a component provided in the mullion; and
   a connection line that is connected to the component and extends towards at least one of an inside and an outside of the first and second bodies.

2. The vacuum adiabatic body of the claim 1, wherein the component comprises at least one of a pipe, a controller, a heater and a tray.

3. The vacuum adiabatic body of the claim 1, wherein the connection line comprises at least one of a power supply line, a signal line and a fluid line.

4. The vacuum adiabatic body of the claim 1, wherein the component comprises a controller that supplies power to a part, or sends and receives signal to the part, and
   wherein the part comprises at least one of a lamp, a sensor and a compressor.

5. The vacuum adiabatic body of the claim 4, wherein the connection line comprises at least one of a power supply line and a signal line to electrically connect the controller with the part.

6. The vacuum adiabatic body of the claim 1, wherein the component comprises a tray to store a fluid, and the connection line comprises a fluid line to transfer the fluid generated in at least one of the first and second bodies to the tray.

7. The vacuum adiabatic body of the claim 6, wherein the first and second bodies comprises at least one evaporator, and the fluid line comprises a defrost water line fluidly connected to the tray and in which a defrost water generated in the at least one evaporator flows.

8. The vacuum adiabatic body of the claim 1, wherein the component comprises a heater that supplies heat to a fluid.

9. The vacuum adiabatic body of the claim 1, wherein the component comprises a pipe in which a fluid flows, and the connection line comprises a drain pipe to transfer the fluid generated in an evaporator to the pipe.

10. The vacuum adiabatic body of the claim 1, wherein the component comprises a pipe in which a fluid flows, and the connection line comprises an air path to transfer the fluid provided in the first body to the second body.

11. The vacuum adiabatic body of the claim 1, wherein the mullion comprises an opening through which the connection line passes, and wherein the connection line passes through the opening and extends towards the vacuum space.

12. A vacuum adiabatic body comprising:

first and second bodies, each of the first and second bodies including a first plate, a second plate and a vacuum space provided between the first plate and the second plate;

a mullion provided between the first and second bodies; and a component provided in the mullion, wherein the component comprises a pipe into which a fluid stored in at least one of the first and second bodies is introduced.

13. The vacuum adiabatic body of the claim 12, wherein the pipe comprises a connection pipe in which the fluid generated in an evaporator flows, the evaporator being provided in at least one of the first and second bodies.

14. The vacuum adiabatic body of the claim 13, wherein the component further comprises a drain device to manage the fluid generated in the evaporator.

15. The vacuum adiabatic body of the claim 14, wherein the drain device comprises at least one of a tray to store the fluid and a heater to supply heat the fluid.

16. The vacuum adiabatic body of the claim 12, wherein the pipe comprises an air path in which the fluid stored in one of the first and second bodies flows, and wherein the air path extends towards the other of the first and second bodies to supply the fluid to the other of the first and second bodies.

17. The vacuum adiabatic body of the claim 12, further comprising a connection line that passes through at least one of the first plate and second plate and is fluidly connected to the pipe.

18. A vacuum adiabatic body comprising:

first and second bodies, each of the first and second bodies including a first plate, a second plate and a vacuum space provided between the first plate and the second plate;

a mullion provided between the first and second bodies; and a component provided in the mullion, wherein the component comprises a controller that is electrically connected to an electronic part.

19. The vacuum adiabatic body of the claim 18, wherein the electronic part comprises at least one of:

a lamp provided inside at least one of the first and second bodies;

a sensor provided inside at least one of the first and second bodies;

a compressor provided outside the first and second bodies; and a heater provided in the mullion.

20. The vacuum adiabatic body of the claim 18, further comprising a connection line that passes through at least one of the first plate and second plate and connects the controller to the electronic part.

* * * * *